United States Patent
Kihara et al.

(10) Patent No.: US 6,625,625 B1
(45) Date of Patent: Sep. 23, 2003

(54) SYSTEM AND METHOD FOR BACKUP AND RESTORING BY UTILIZING COMMON AND UNIQUE PORTIONS OF DATA

(75) Inventors: Ken-ichi Kihara, Fujisawa (JP); Toshiaki Hirata, Kashiwa (JP); Taro Saito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/542,160

(22) Filed: Apr. 4, 2000

(30) Foreign Application Priority Data

Apr. 9, 1999 (JP) .......................... 11-102167

(51) Int. Cl.[7] .............................. G06F 17/30
(52) U.S. Cl. .................... 707/204; 707/202; 714/2
(58) Field of Search .................. 707/201, 202–204; 709/248; 714/2, 8, 10, 12

(56) References Cited

U.S. PATENT DOCUMENTS 5,765,173 A * 6/1998 Cane et al. ............... 707/204
5,778,395 A * 7/1998 Whiting et al. ........... 707/204
5,898,836 A * 4/1999 Freivald et al. ........... 707/513
5,990,810 A * 11/1999 Williams .................. 341/51
6,003,044 A * 12/1999 Pongracz et al. .......... 707/204
6,078,960 A * 6/2000 Ballard .................... 709/229
6,332,217 B1 * 12/2001 Hastings .................. 707/1

FOREIGN PATENT DOCUMENTS

JP 2297643 10/1990
WO WO 9625801 A1 * 8/1996

* cited by examiner

Primary Examiner—Hosain T. Alam
(74) Attorney, Agent, or Firm—Sofer & Haroun, LLP

(57) ABSTRACT

In an information processing system environment including a plurality of client machines and at least a server, backup data is sorted out into a data portion common to respective client machines and a data portion unique to respective client machines, and each data portion is stored separately. Owing to the arrangement mentioned in the above, it is made possible to save the disk space effectively.

15 Claims, 29 Drawing Sheets

SYSTEM AND METHOD FOR BACKUP AND RESTORING BY UTILIZING COMMON AND UNIQUE PORTIONS OF DATA

BACKGROUND OF THE INVENTION

1. Field of the Invention

The present invention relates to a data backup technique in a system composed of a plurality of information processing machines (apparatuses), and in particular it relates to a data backup system (preservation of data) and a data restore system (recovery of data) for a plurality of client machines (apparatuses) in a network system and a method thereof.

2. Description of the Prior Art

The reduction of TCO (total cost of ownership) is a subject in the field of a network/system management, and the management cost of the client machines hinders the reduction of TCO.

The recovery from a disk-crush needs a lot of manpower for the re-installment and environmental setting of an OS or application soft. The cost for recovery is regarded to be the main cause of raising the management cost.

In order to cope with the recovery from a disk-crush, it has been known that to have a backup is an effective way, and concerning the backup technique in the network system, for example, a backup technique is described in a Japanese Patent Laid-open No. Hei 2-297643. The purpose of the technique is to obtain backup for a plurality of client machines (work station), and a server to be used for backup is provided in this technique and backup files on the client machines are stored in the server.

According to the above technique, the size of data backup area on the server is the total sum of the backup data of all client machines (work station), so that when the number of client machines is large, a backup area on the server is necessary to be made large correspondingly thereto. Considering the disk capacity necessary for backup, if the backup only for the server is performed and that for the client machines is given up, as an outgrowth of such an idea the recovery from a disk-crush becomes impossible.

SUMMARY OF THE INVENTION

An object of the present invention is to reduce the backup data size of a storage unit of client machines in the environment where a plurality of client machines are used, and further object of the present invention is to expedite backup by removing obstacles for backup and to enable the system to cope with the recovery from a disk-crush. A still further object of the present invention is to reduce the management cost of the system.

In order to achieve the above-mentioned objects, the present invention provides a data backup system executed by an information processing system including a plurality of client machines and at least one unit of server and a method of operation thereof. The data backup system detects data common to respective client machines and data unique to the respective client machines, and stores the common data portion and the unique data portion separately.

In the present invention, common portions in the data (file groups) of respective client machines are detected and the common portions and the unique portions are stored (backup) separately, so that the total capacity of backup data can be reduced.

In many cases, a file or a file group of each client unit in the same network system has a similar configuration and contents. As a result, the contents of the backup data of each client unit are apt to be similar ones to each other. The present invention utilizes this characteristic.

In other words, in the case of a backup data storage means composed of a group of data or a plurality of groups of data in the equipment having a storage means, the contents of data contained in the backup data in the different client machines are compared, and when the identical contents are found in the different machines, the groups of data having the identical contents in the different machines are summarized to a group of data and stored.

Further, the present invention comprises a storage means for storing the common backup data forming a group of data or a plurality of groups of data for the above-mentioned machines and another storage means for storing data other than the above-mentioned common backup data, the data also forming a group of data or groups of data for the above-mentioned machines.

Further, the present invention comprises means for storing the common backup data forming a group of data or a plurality of groups of data for the above-mentioned machines, i.e., a storage means for storing the common backup data, and a storage means for storing information showing that which group of data contained in the common data storage means are contained in the backup data for the above-mentioned machines, that is, a data owner information storage means.

Further, the present invention comprises a take-out function of taking-out a group of data or a plurality of groups of data, for respective machines, which are stored in the backup data storage means.

Further, the present invention comprises means for storing the backup data, that is, a server, and another means having a function of exchanging information with the server, that is, a client.

Further, according to the present invention pieces of attributive information of data such as a data name, a data size or a renewal date of data are exchanged between the client and the server.

Further, in the present invention, data which is required to be transferred from the client to the server is decided based on the attributive information of data exchanged between the client and the server.

Further, in the present invention, the check codes which can be obtained by the calculation from the contents of data such as a cyclic redundancy check or checksum are exchanged between the client and the server.

Further, in the present invention, data which is required to be transferred from the client to the server is decided based on the check codes exchanged between the client and the server.

Further, in the present invention, information is transferred from the server to the client by a different means from the transfer means with which information is transferred from the client to the server.

Further, in the present invention, a storage medium is used as an information transfer means from the server to the client.

Further, in the present invention, a communication means which is suitable for the transmission of a large capacity of data is used as an information transfer means from the server to the client.

The foregoing and other objects, advantages, manner of operation and novel features of the present invention will be understood from the following detailed description when read in connection with the accompanying drawings.

DETAILED DESCRIPTION OF THE PREFERRED EMBODIMENTS

1. First Embodiment

The first embodiment includes the basic configuration of the present invention.

Figure 1:
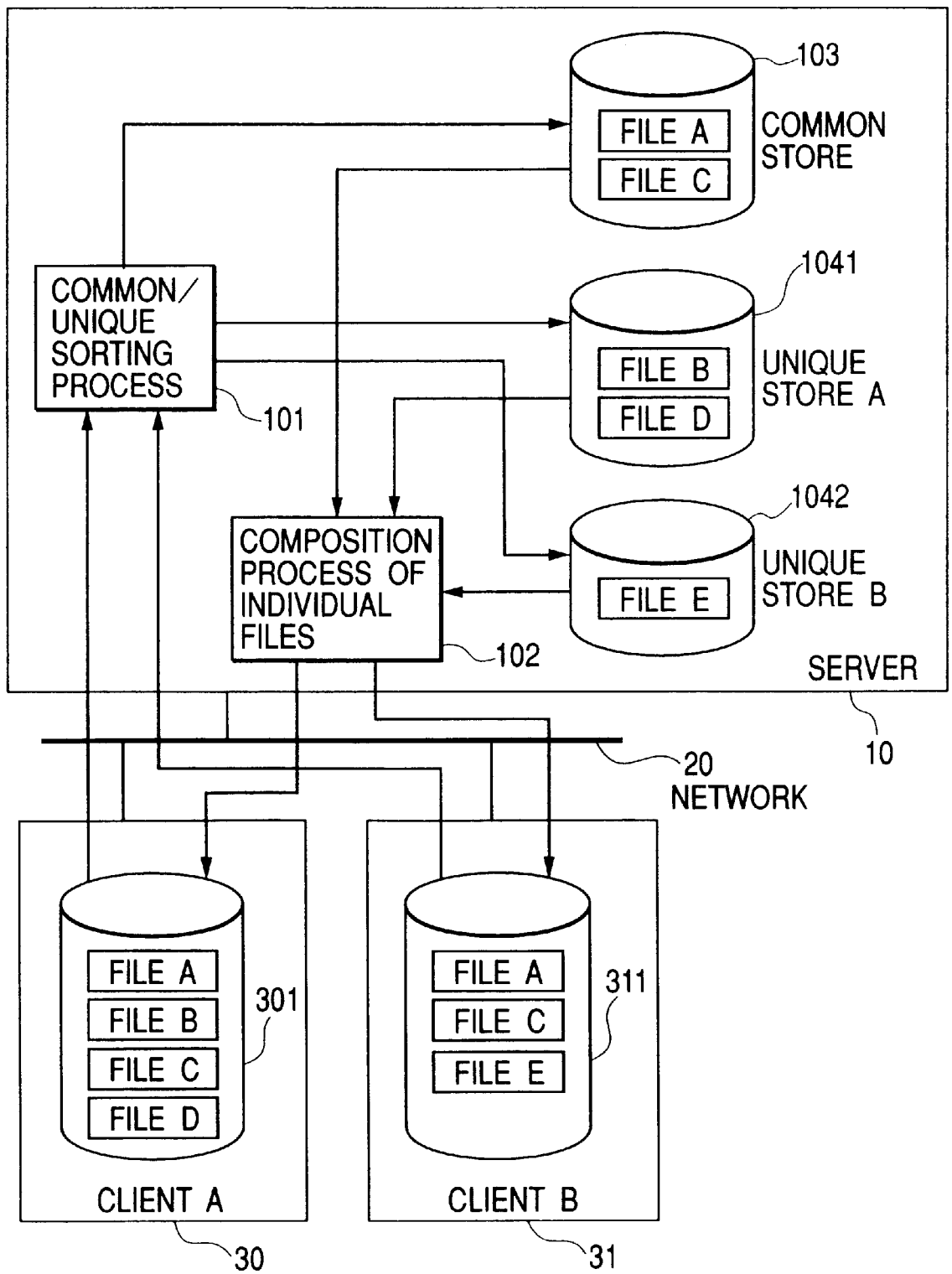
FIG. 1 shows an illustrative view showing the principle of a backup system for clients according to the present invention.

FIG. 1 shows the principle of the first embodiment. The first embodiment is composed of a server 10, a network 20, a client A 30 and a client B 31. In FIG. 1, two units of clients are shown, but the number of clients may be one or three or more and generally several tens of clients are equipped in an ordinary office system. The client A 30 and the client B 31 are connected to the server 10 through a network 20.

Respective clients have their local files, and in a case of preparing the backup, the contents of respective files are transmitted to the server 10. The server 10 sorts out the data in the files sent from respective clients into a common portion and a unique portion through a sorting process of common/unique 101. The common portion is stored in a common store 103, and the unique portion to the client A 30 is stored in a unique store A 1041 for the client A and the unique portion to the client B 31 is stored in a unique store A 1042 for the client B.

For example, in the embodiment shown in FIG. 1, the client A 30 has four files, File A, File B, File C and File D in a file apparatus 301, and the client B 31 has three files, File A, File C and File E in a file apparatus 311. The file A and the file C which are common to both clients are stored in the common store 103. The File B and File D in the file apparatus 301 owned by the client A 30 are unique to the client A 30, so that they are stored in the unique store A 1041. Similarly, the File E in the file apparatus 311 owned by the client B 31 is stored in a unique store B1042. The File A and the File C owned by the client A and the client B are not stored separately but they are put together in one respectively, so that storage area therefor can be saved.

In a case where the backed up files are returned to the original client, the original file group can be obtained by combining files in the common store 103 with files in the client unique store. The composition of files is performed in an individual file composition process 102. For example, when the file apparatus 301 owned by the client A 30 is in need of restore, the File A and the File C in the common store 103 and the File B and File D in the unique store A 1041 being unique to client A are used as the restore data for the client A 30.

Figure 2:
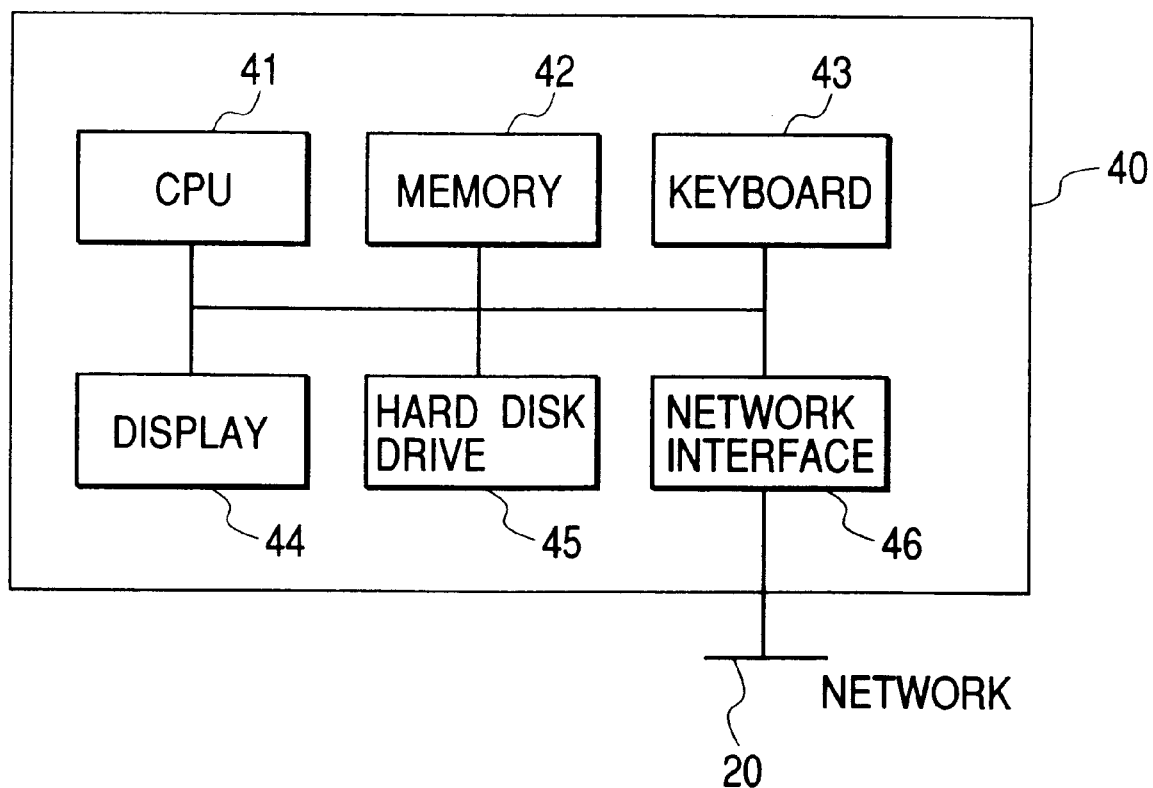
FIG. 2 shows a diagram showing hardware configuration according to the present invention.

FIG. 2 shows an example of hardware configuration of the server and the client used in the network system. The hardware comprises a CPU 41, a memory 42, a keyboard 43, a display 44, a hard disk drive 45 and a network interface 46.

The network interface 46 is connected to other machines with the network 20.

Figure 3:
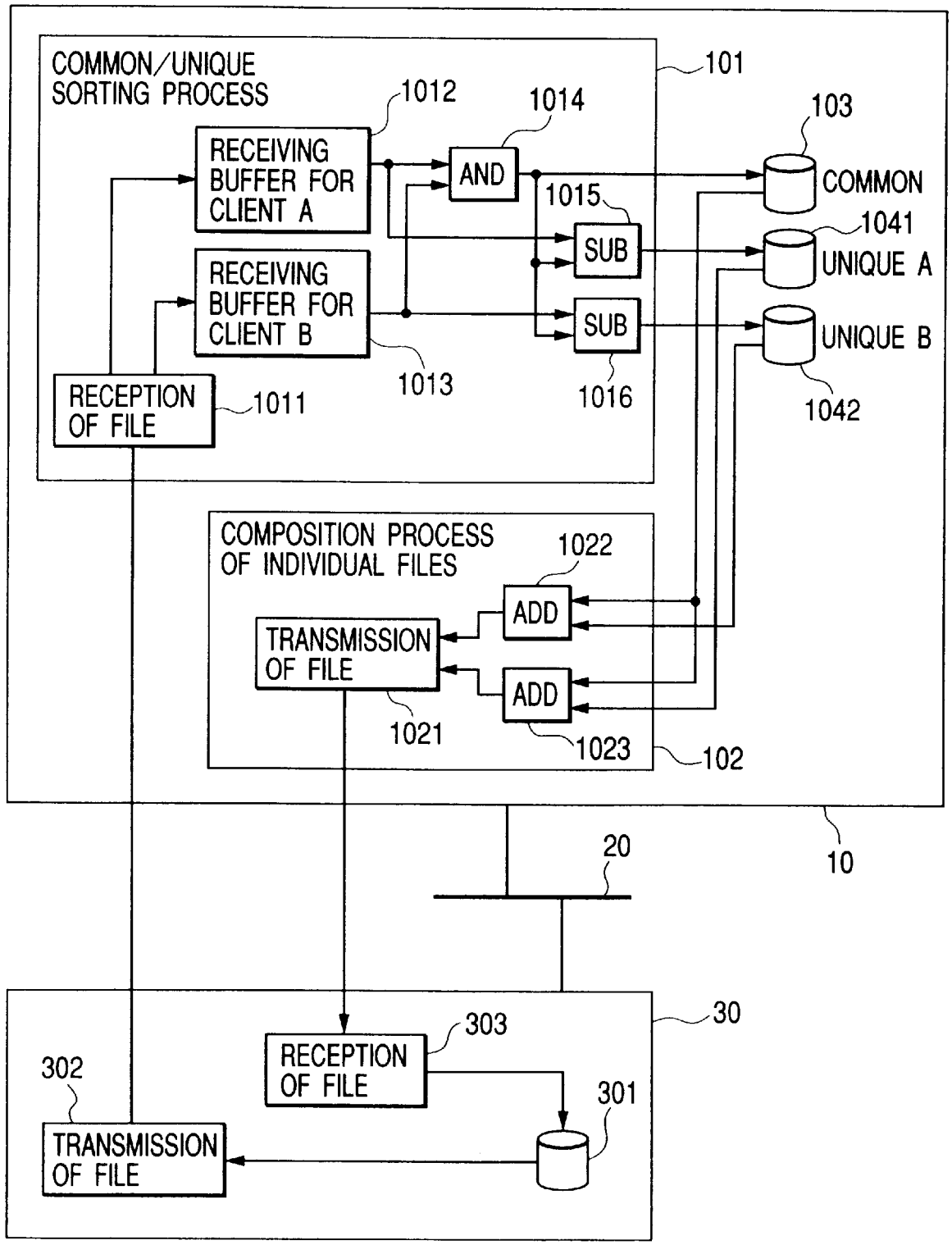
FIG. 3 shows a logical block diagram of the present invention.

FIG. 3 shows a diagram for explaining an internal processing method, in which the flow of data shown in FIG. 1 is shown. The client A 30 has a file apparatus 301, a file transmitting function 302, and a file receiving function 303. The file apparatus 301 stores the files used in the client A 30, and corresponds to the above-mentioned hard disk drive 45. When the backup of files is performed, the file transmitting function 302 has a function to transmit the files in the file apparatus 301 to the server 10, and it is realized on the memory 42 as a program which is executed by the CPU 41. On the contrary, when the restore of files is performed, the file receiving function 303 has a function to receive files from the server 10 and store them in the file apparatus 301, and it is realized on the memory 42 as a program which is executed by the CPU 41.

The server 10 receives the files sent from the client A 30 with a file receiver 1011 provided in the common/unique sorting process 101 (It is realized as a program executed by the CPU 41 on the memory 42) and stores the files in the receiving buffer 1012 for the client A or in the receiving buffer 1013 for the client B for clients (The receiving buffers should be prepared in the hard disk drive 45 by the number corresponding to the number of clients which require backup). From the files stored in respective receiving buffers, the common portion is extracted with AND 1014 and the common files are stored in the common store 103 in the hard disk drive 45. From the files stored in the receiving buffer 1012 for the client A, the common portion is subtracted with SUB 1015 and the remaining files are stored in the unique store A 1041 in the hard disk drive 45. Similarly, the common portion is subtracted from the files stored in the receiving buffer for the client B 1012 with SUB 1016 and the remaining files are stored in the unique store B1042 in the hard disk drive 45.

In a case of restore, in the individual file composition process 102 (It is realized as a program executed by the CPU 41 on the memory 42), files in the common store and those in the unique store are composed by the number corresponding to the number of clients which are in need of restore and the thus composed files are transmitted to the clients with the use of the file transmitter 1021. For example, when the client A 30 is in need of restore, the contents of the common store 103 and those in the unique store A 1041 are combined with the use of ADD 1022 and the thus obtained sum is transmitted to the client A 30.

Figure 4:
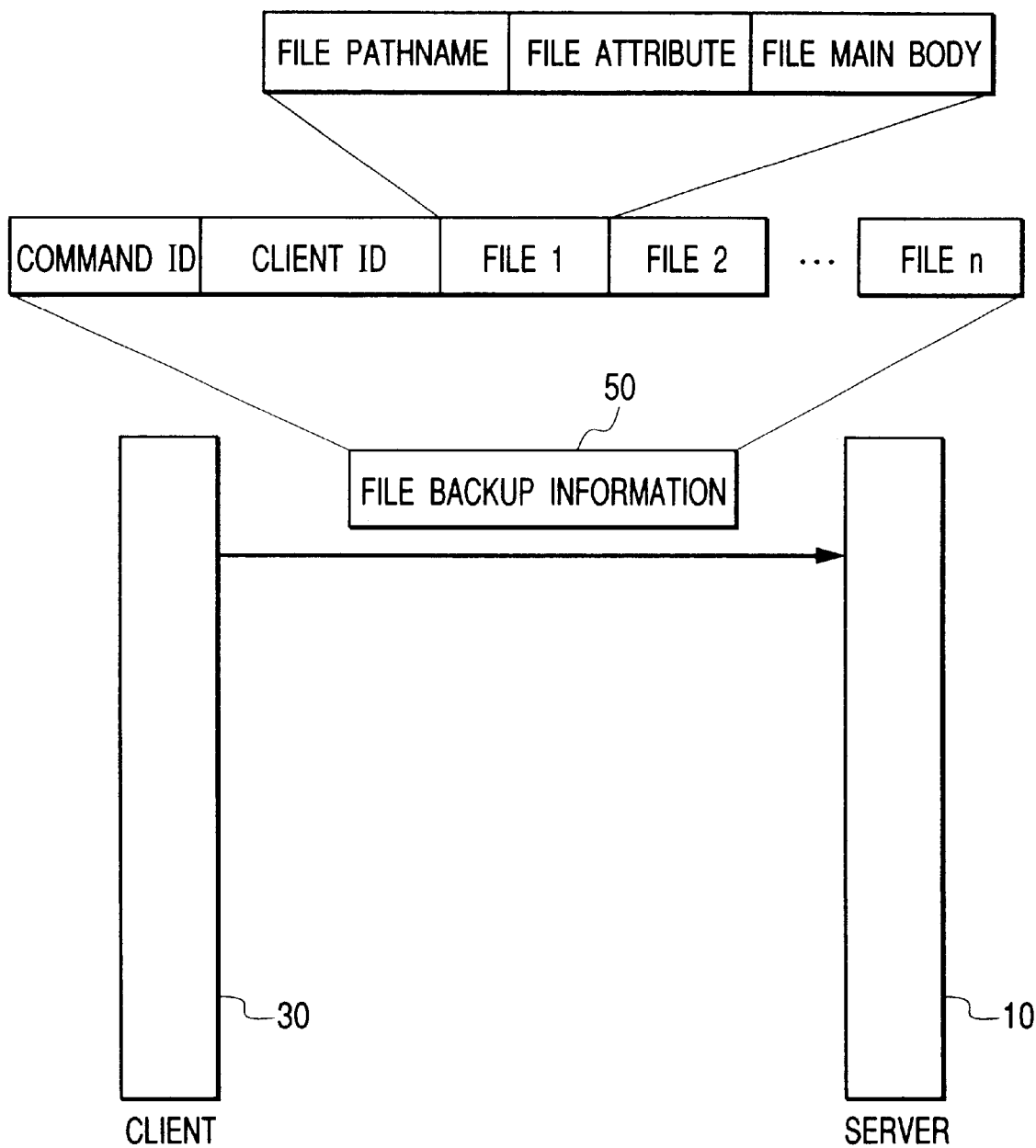
FIG. 4 shows a diagram showing the protocol for backup.

FIG. 4 shows the backup protocol between the clients and the server, and the backup is executed by respective process programs mentioned in the above. In a case where the backup is needed, file backup information 50 is transmitted from the client A 30 to the server 10. In the file backup information 50, a command ID (an identification code showing a backup operation) and an ID identifying a client are placed in the heading part and following these ID's file data continues. The contents of data of each file may include a file pathname, a file attribute, a file main body, etc.

Figure 5:
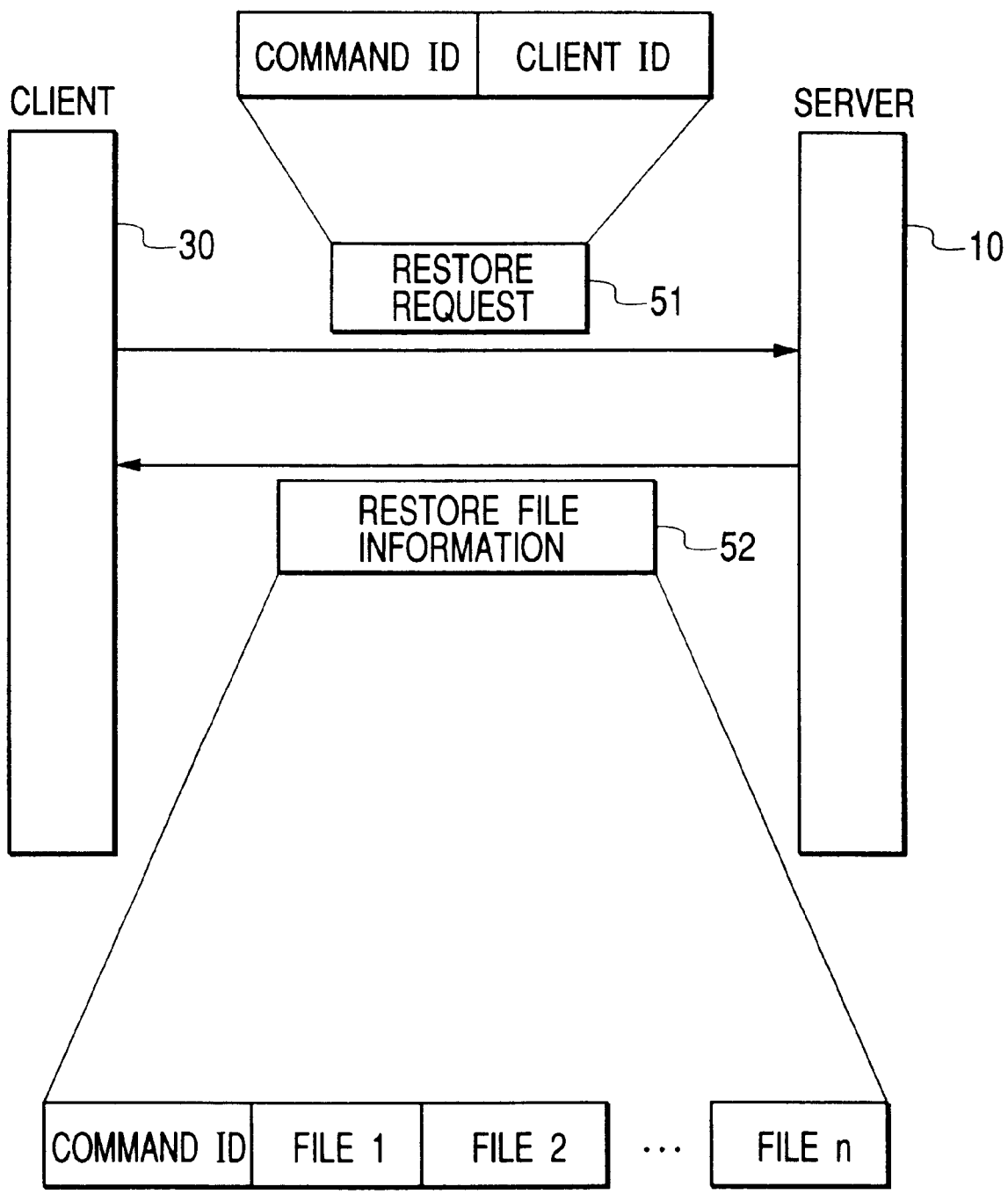
FIG. 5 shows a diagram showing the protocol for restore.

FIG. 5 shows the protocol for the restore between clients and the server, and the restore operation is executed using the above-mentioned processing programs. In a case of restore, a restore request 51 is sent from the client A 30 to the server. The restore request 51 should include a command ID (an identification code showing a restore request) and a client ID. The server 10 which has received a restore request 51 prepares files for the client with the above-mentioned method based on the client ID in the restore request 51 and send them to the client as restore file information 52. In the restore file information 52, the command ID (an identification code showing the restore file information) is placed in the heading part and the file main body follows.

Figure 6:
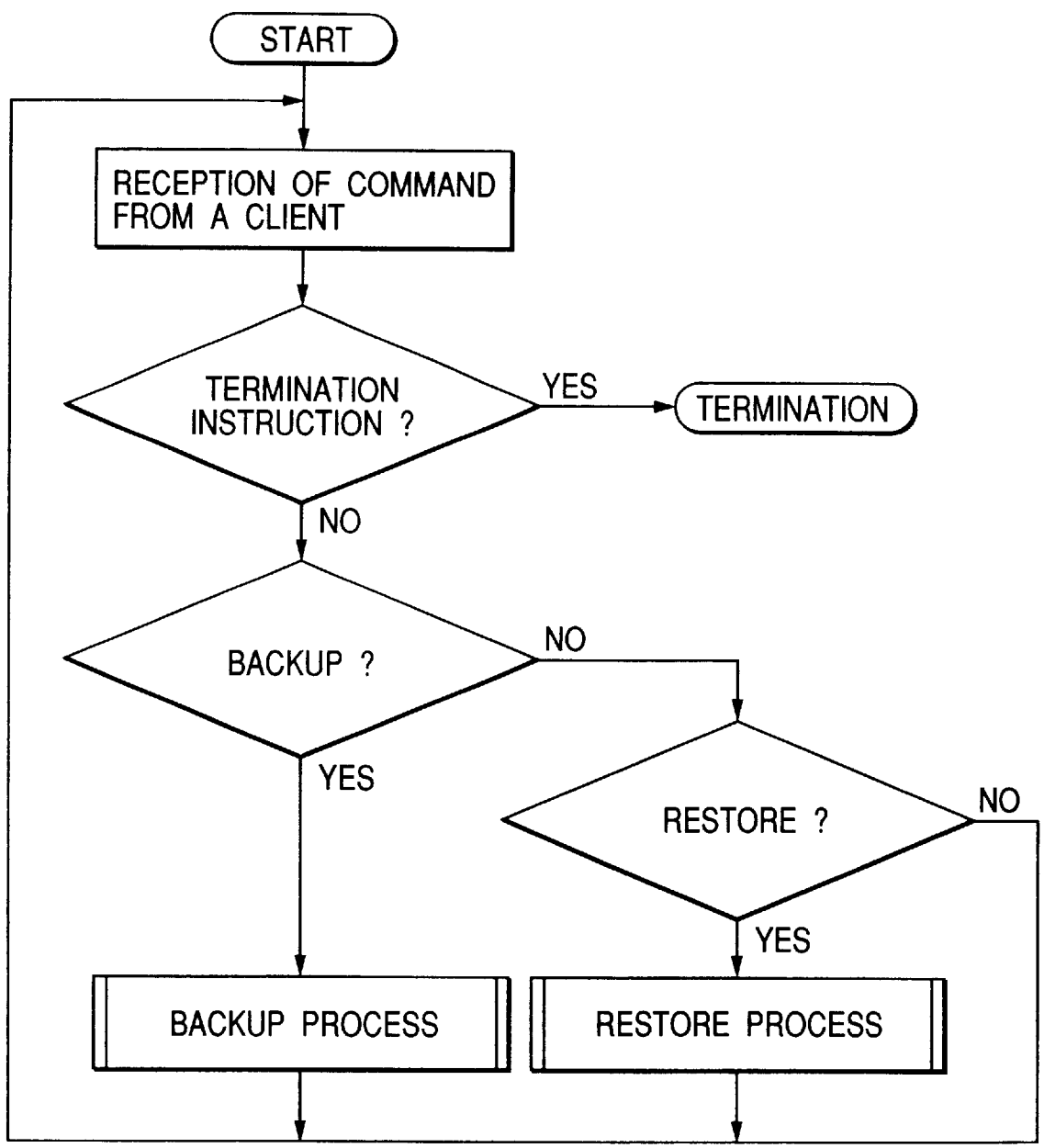
FIG. 6 shows a diagram showing the main process on the side of a server.

FIG. 6 shows the flow of data in the main process on the server side, and it is executed by the above-mentioned respective processing programs. When the server receives a command from a client, it executes the command as designated by each command, that is, a termination designation, backup information 50 or a restore request 51 is executed.

Figure 7:
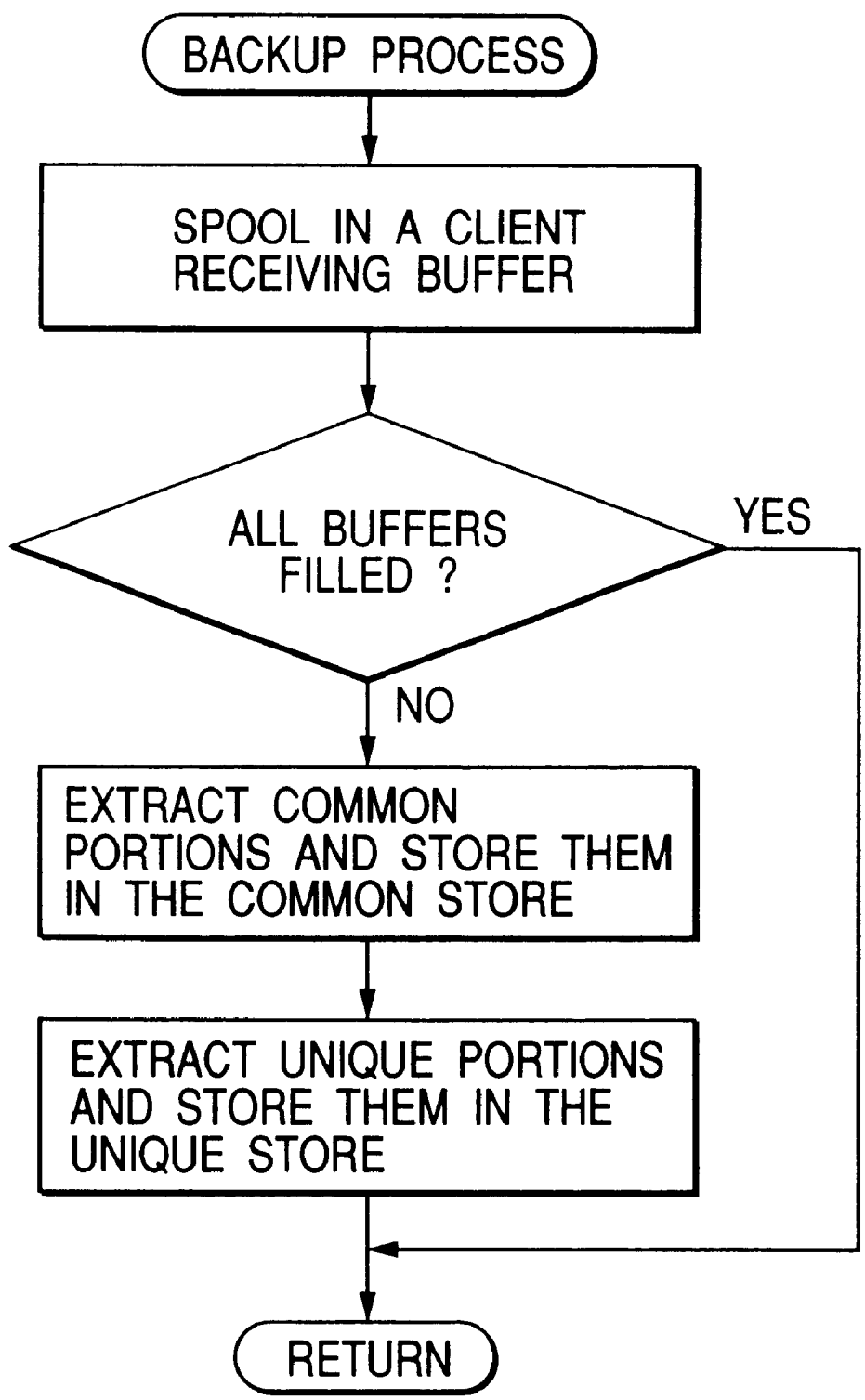
FIG. 7 shows a diagram showing the backup process on the side of the server.

FIG. 7 shows the contents of a backup process on the server side, and the process operation is executed by the above-mentioned process programs. The files sent from clients are spooled in the client receiving buffer. As mentioned in the above, files are stored in the receiving buffer for the client A 1012, or in the receiving buffer for the client B 1013 Next, the contents of all buffers are confirmed and judged whether backup files from all clients are collected or not. If all files are not collected, the process is terminated. If all files are collected, the server extracts the files which are common to all buffers and store them in the common store 103. The unique files are stored in the unique store A 1041 or in the unique store B1042.

Figure 8:
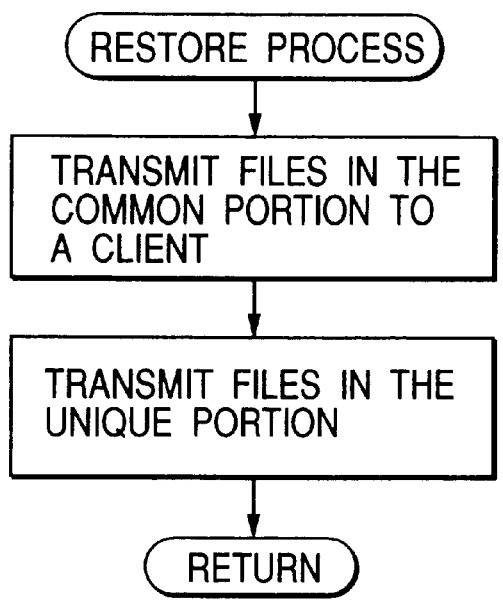
FIG. 8 shows a diagram showing the restore process on the side of the server.

FIG. 8 shows the flow of data in the restore process on the server side. The process is executed by the above-mentioned respective process programs. The common files and the unique store files of the client which issued the restore request are transmitted to the client which issued the restore request.

The state of common files in the server 10 is not visible because the process is performed internally. However, when the state is displayed on a screen, the common files effect can be visually confirmed.

Figure 9:
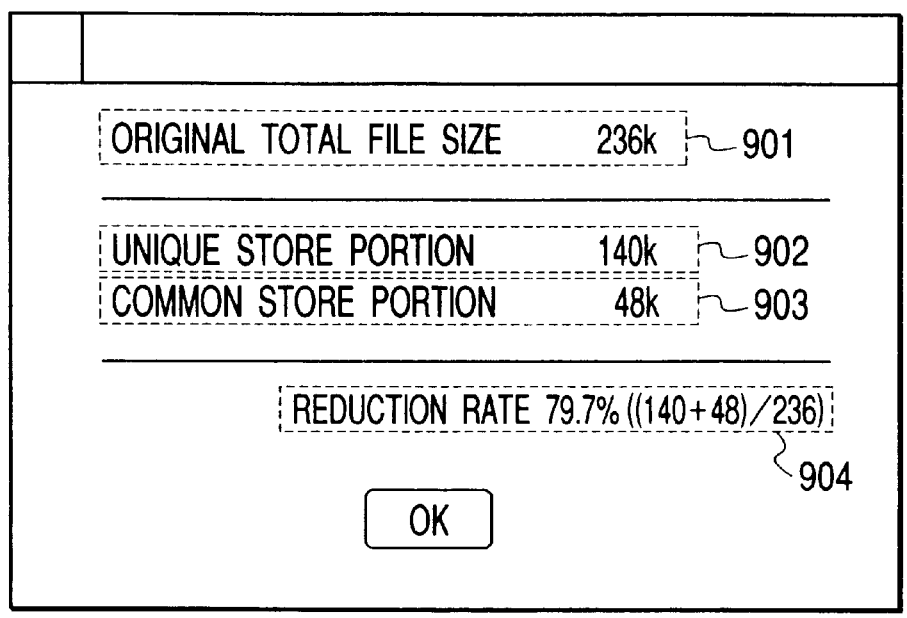
FIG. 9 shows an illustrative view showing a screen for the confirmation of a common file effect.

FIG. 9 shows an example of a screen displayed by the common/unique sorting process 101 on the display 44 shown in FIG. 2 for the confirmation of the common files effect. The file sizes of the unique store portion and the common store portion are shown. The original total file size 901 shows the total sum (no common) of files on the side of clients, the unique store portion shows the sum of the client unique store (in FIG. 3, 1041 and 1042), and the common store portion shows the size of the common store 103. The reduction rate 904 shows a value obtained by dividing the sum of the unique store portion 902 and the common store portion 903 by the original total file size 901, and the value shows the degree of the effectiveness of common files.

Figure 10:
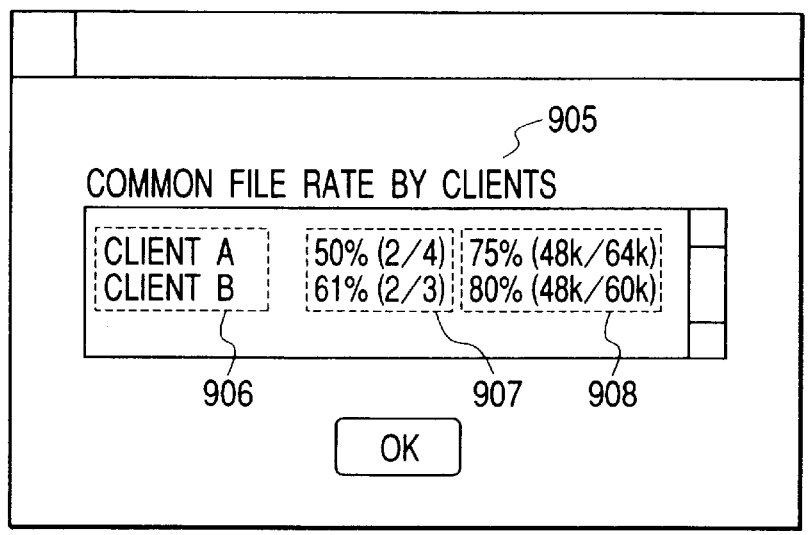
FIG. 10 shows an illustrative view showing a display screen for a common file rate by clients.

FIG. 10 shows an example of a display screen of the common files rate by clients sorted out by the common/unique sorting process 101 shown on the display 44 shown in FIG. 2. The display shows the percentage of common files to the whole files in respective clients 906 from the point of view of the numbers of files 907 and the sizes of files 908.

Figure 11:
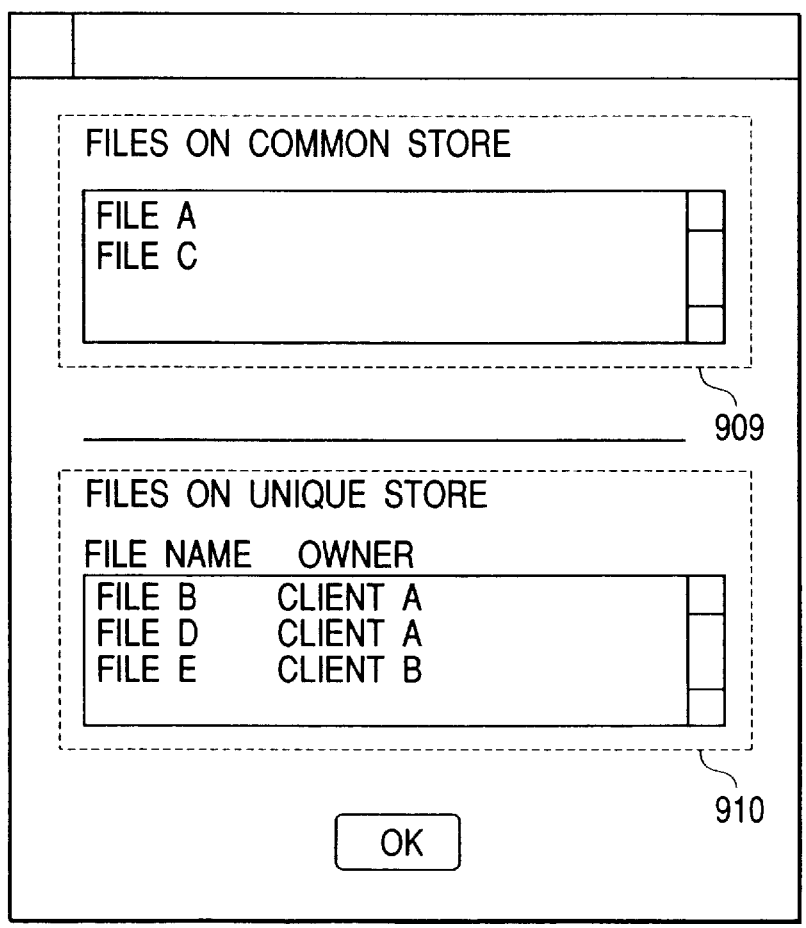
FIG. 11 shows an illustrative view showing a display screen for a state of common files.

FIG. 11 shows an example of the display screen shown on the display 44 shown in FIG. 2 showing the state of common files sorted out by the common/unique sorting process 101, and it shows the files in the common store and the files in the unique store respectively, so that users are able to confirm visually which are common files.

As mentioned above, according to the first embodiment, the backup data of client machines is collected in the server, the backup data of respective clients is compared and when common files are found, they are put together into one and pre-served, which makes it possible to save the disk space on the server.

2. Second Embodiment

Figure 12:
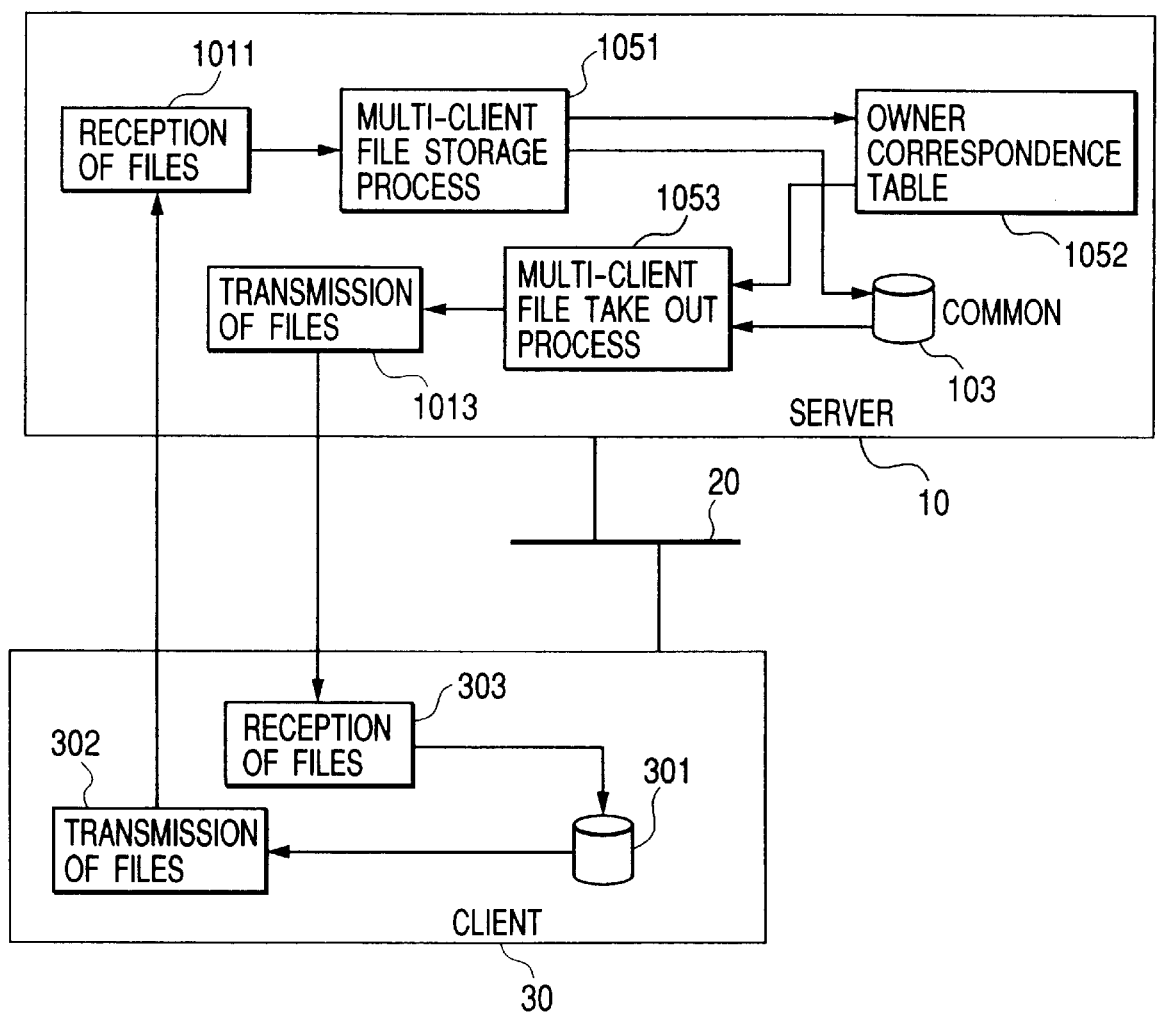
FIG. 12 shows a block diagram of a second embodiment.

As the second embodiment, a different storing method of files for backup on the server 10 is shown in FIG. 12. In place of the common/unique sorting process 101, the individual file composition process 102, the unique store A 1041 for the client A and the unique store A 1042 for the client B in the first embodiment (FIG. 3), the followings are provided in the second embodiment: a multi-client-file-storage-process 1051 (It is realized as a program executed by the CPU 41 on the memory 42), an owner correspondence table 1052 (It is realized on the memory 42), and a multi-client-file-take-out-process 1053 (It is realized as a program executed by the CPU 41 on the memory 42). The second embodiment is characterized by the change of the server 10 and the client A 30 may remain unchanged and may be similar to the first embodiment.

Figure 13:
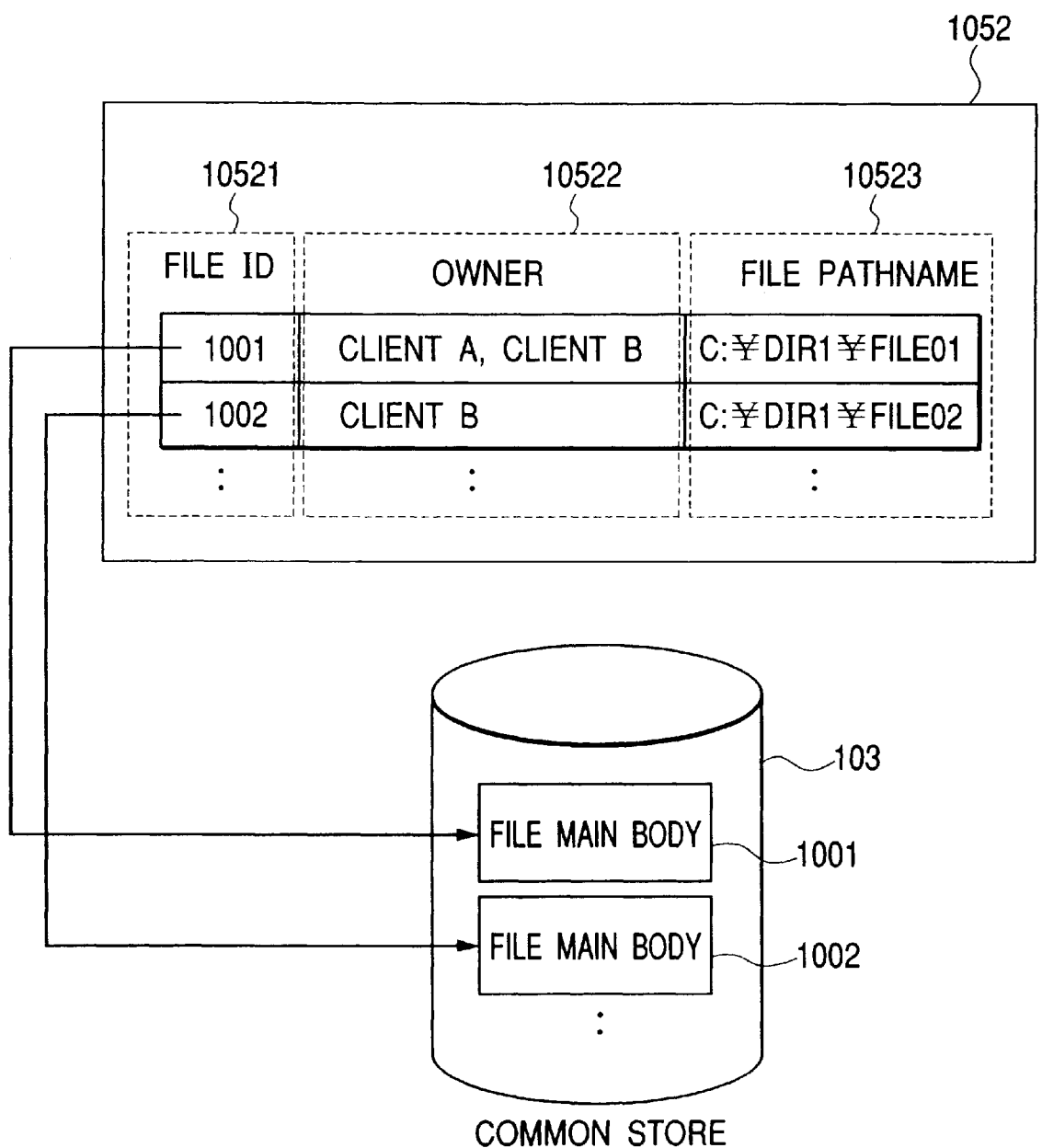
FIG. 13 shows an illustrative view showing an example of an owners correspondence table.

The owner correspondence table 1052 shows that which client is the owner of a file for the files in the common store 103, and as shown in FIG. 13, every file on the common store has the file ID No. 10521, owner's name 10522 and file pathname 10523, and a lateral line of the owner correspondence table makes a record of a file.

The file ID 10521 works as a relation between the owner correspondence table 1052 and the common store 103, and the record of a file on the table forms information used to show that the file having the record corresponds to which file on the common store 103. In the example shown in FIG. 13, the file ID's in the column 10521 are shown by numerical values such as 1001 and 1002, but if a distinction from each other is clear symbols may be used. The owner 10522 shows that a file is owned by which client. The file pathnames 10523 show that a file has been arranged (or will be arranged) at what place (which file path) on the client file apparatus 301.

Figure 14:
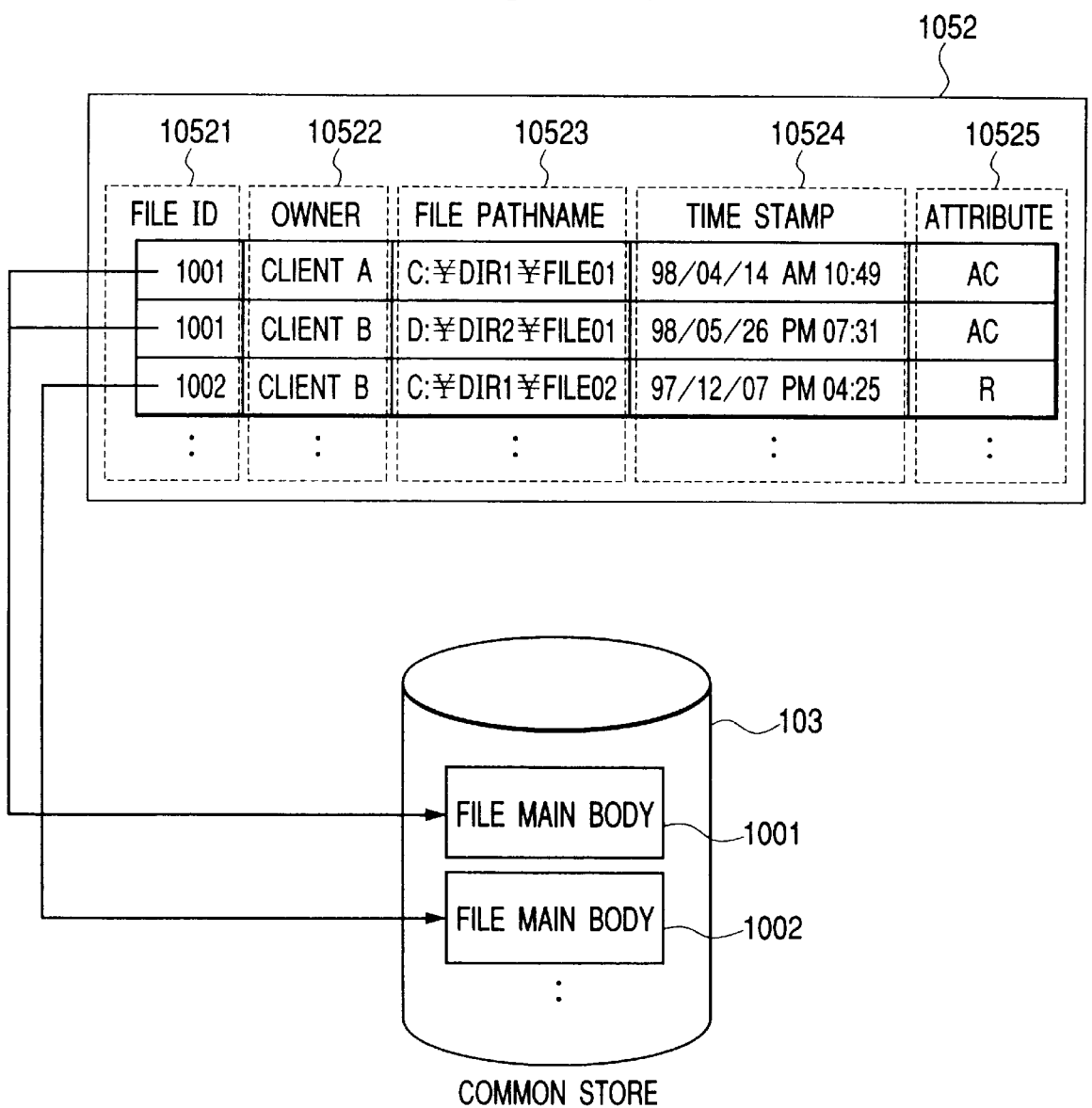
FIG. 14 shows an illustrative view showing another example of the owners correspondence table.

FIG. 14 shows another example of the owner correspondence table 1052. In FIG. 13, a file in the common store 103 is associated with one line (one record) in the owner correspondence table 1052, but in FIG. 14, one file in the common store 103 is associated with a plurality of lines in the owner correspondence table 1052. Thus, in a case where the file pathnames 10523 (or the time stamp 10524 or the attribute 10525) are different but the contents of files are identical, in the example shown in FIG. 13 a plurality of files are to be stored in the common store 103; however, owing to the arrangement shown in FIG. 14 only one file will be stored. It is shown in the example shown in FIG. 14 that a file having a file ID of 1001 is arranged at C: ¥DIR1¥FILE01 on the file apparatus 103 of the client A, and in the case of the client B, the file 1001 is arranged at D: ¥DIR2¥FILE01.

Figure 15:
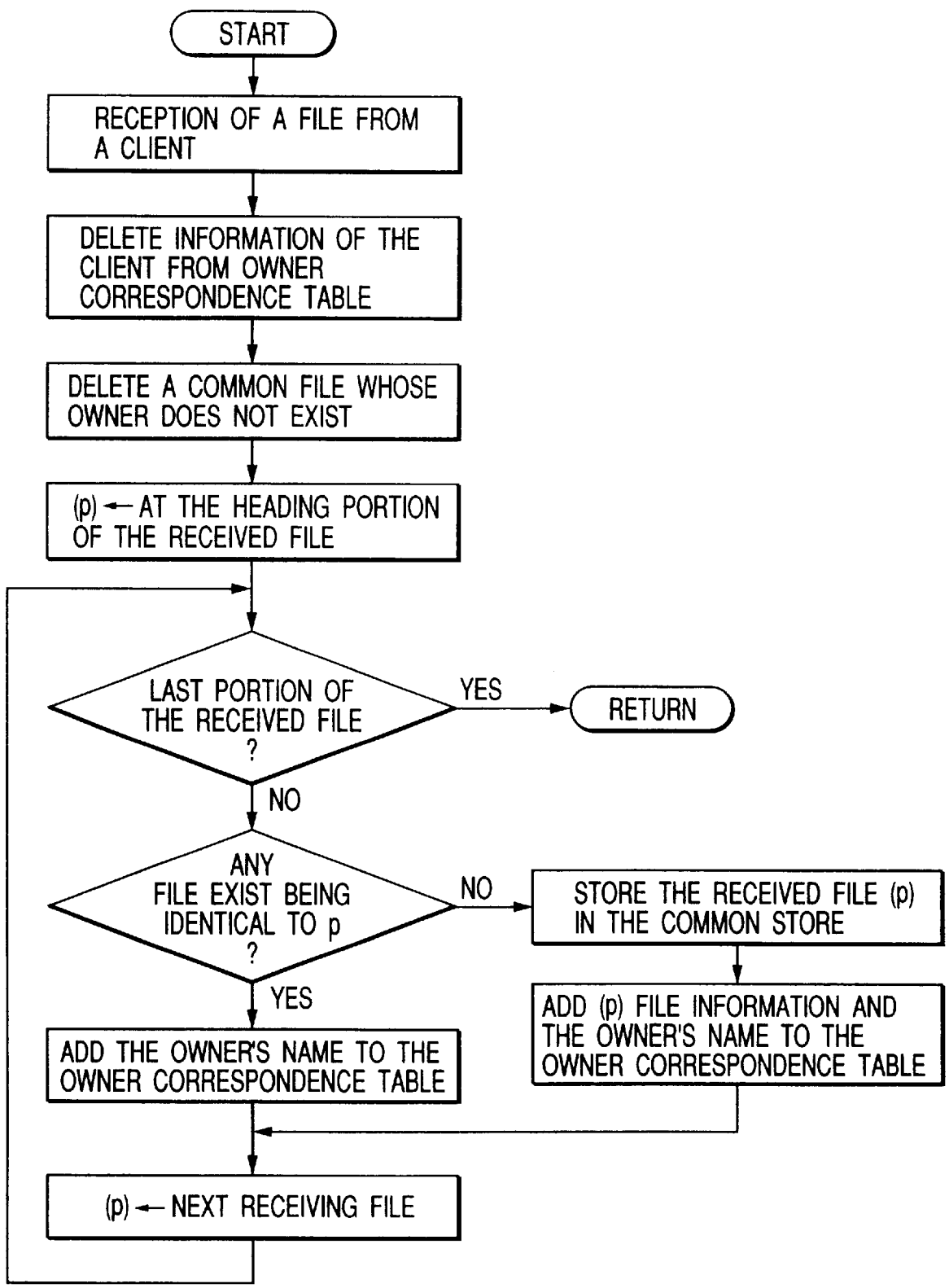
FIG. 15 shows a diagram showing procedures in a backup process in the second embodiment.

The contents of the storage process 1051 in the case of multi-client file are shown in FIG. 15. When the server receives a file from a client, it removes the information of the client who transmitted the file from the owner correspondence table 1052. For example, when the server receives a file from the client B, in the case of an example shown in FIG. 14 (in the range shown in FIG. 14), the records in the second line and the third line are deleted. As a result of deletion of records, the files that have lost the owner in the common store 103 are deleted from the common store 103. The files sent from a client and received by the server are processed as shown below. When a file is received, it is judged whether the identical file already exists in the common store 103 or not, and if not, the file is stored in the common store 103. The contents of the owner correspondence table are updated disregarding the existence of the file in the common store 103.

Figure 16:
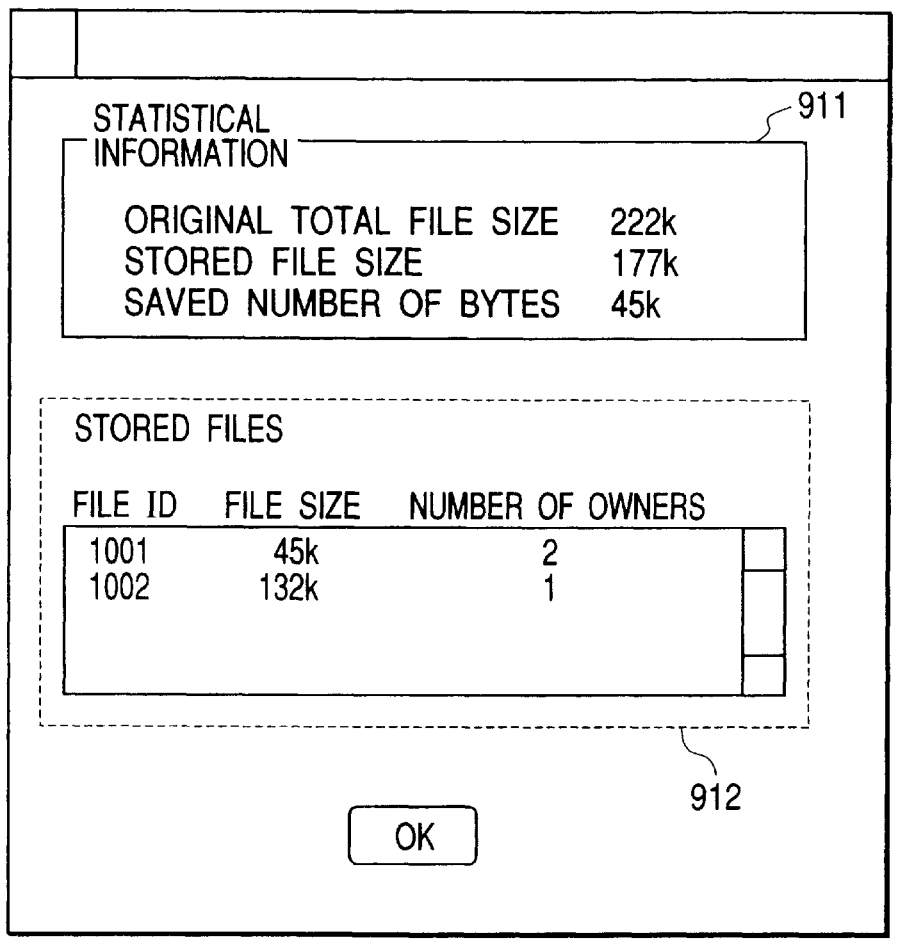
FIG. 16 shows an illustrative view showing a display screen for a state in the second embodiment.

It is proper to have an arrangement to display the state of common files in the server 10 which enables the users to confirm the effect of common files as in the case of the first embodiment. FIG. 16 shows an example of the display. It shows the statistical information 911 which shows an original total file size (the sum of file sizes of clients), a storage file size (the sum of sizes of files stored in the common store 103) and the number of bytes which can be saved (the difference between the two mentioned in the above). FIG. 16 also shows the file sizes and the number of owners of respective files stored in the common store 103 as a table of files 912 stored in the common store 103.

According to the second embodiment, even if a file is not common to all clients, when it is common to two machines or more, it can be dealt as a common file. Therefore, the second embodiment has a possibility of saving more disk space than in the case of the first embodiment.

Next, a method of judgment for judging if a file identical to the file sent from a client already exists in the common store 103 will be explained. When a method is adopted in which each file sent from a client is compared with all files, from a file at the heading part and then to the files following it in order, being stored in the common store 103, the quantity of data to be processed reaches a huge amount due to the two factors explained below.

Factor 1. A Huge Number of Times of Comparison

Comparison is performed with a file at the heading portion and with the following files in order, so that for file on the client side has to be compared as many times s the number of files in the common store 103 in the worst case. Even in an average, the comparison has to be performed as many times as half the number of files in the common store 103 for a file on the client side. When the process is performed for the total files on the client side, in an average, N times of comparison are needed, N=(total number of files on the client side)×(number of files in the common store)/2. For example, assuming that 1,000 files are sent from the client side and 10,000 files exist in the common store 103, in the worst case, the comparison of 10,000,000 times must be performed.

Factor 2. A Huge Quantity of Data has to be Processed Per Comparison

Since the contents of files on both sides have to be compared, processing quantity for one time of comparison becomes inevitably large.

Then a method of reducing the times of comparison will be explained.

The processing quantity per comparison can be reduced by the comparison of the file pathnames, the file length, check-sum, etc. before file main-bodies are compared before the comparison of the files. The number of times of comparison can be reduced by using an efficient comparison method such as a binary search method by sorting the information in the owner correspondence table or the common store 103 based on the file name or the like beforehand.

Figure 17:
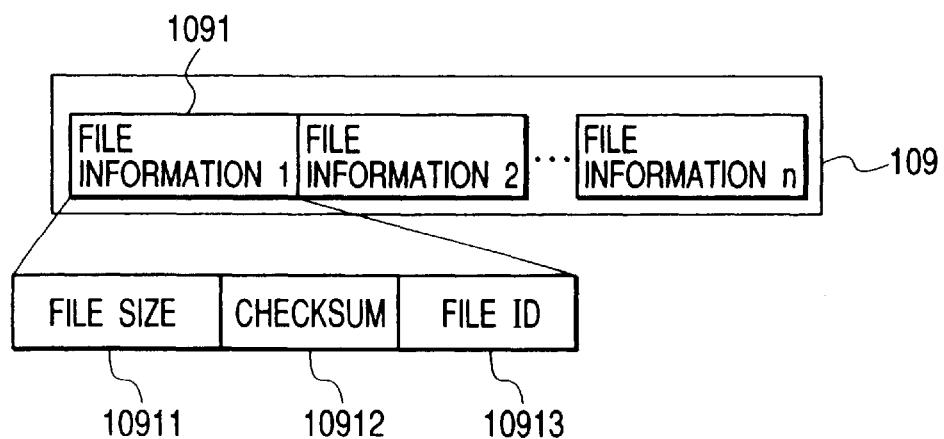
FIG. 17 shows a diagram showing the configuration of a fast lookup table for files in the second embodiment.

An example of an efficient method for the file comparison using the file length as a key will be cited. In the present example of an efficient method, in order to make a file search effective, a fast lookup table for files 109 is prepared. The structure of the fast lookup table for files 109 is shown in FIG. 17. The fast lookup table for files 109 is composed of a single piece or plural pieces of fast lookup file-information 1091, and each piece of fast lookup file-information 1091 includes a file size 10911, a checksum 10912 and a file ID 10913. The fast lookup file-information 1091 is sorted using the file size as a main-key and the checksum as a sub-key. In other words, basically files are sorted out using the file size as a key, and the pieces of fast lookup file-information 1091 having the same file size are sorted using the checksum as a key. The file sizes and the checksum of respective files sent from clients are used to narrow down the comparison subject.

Figure 18:
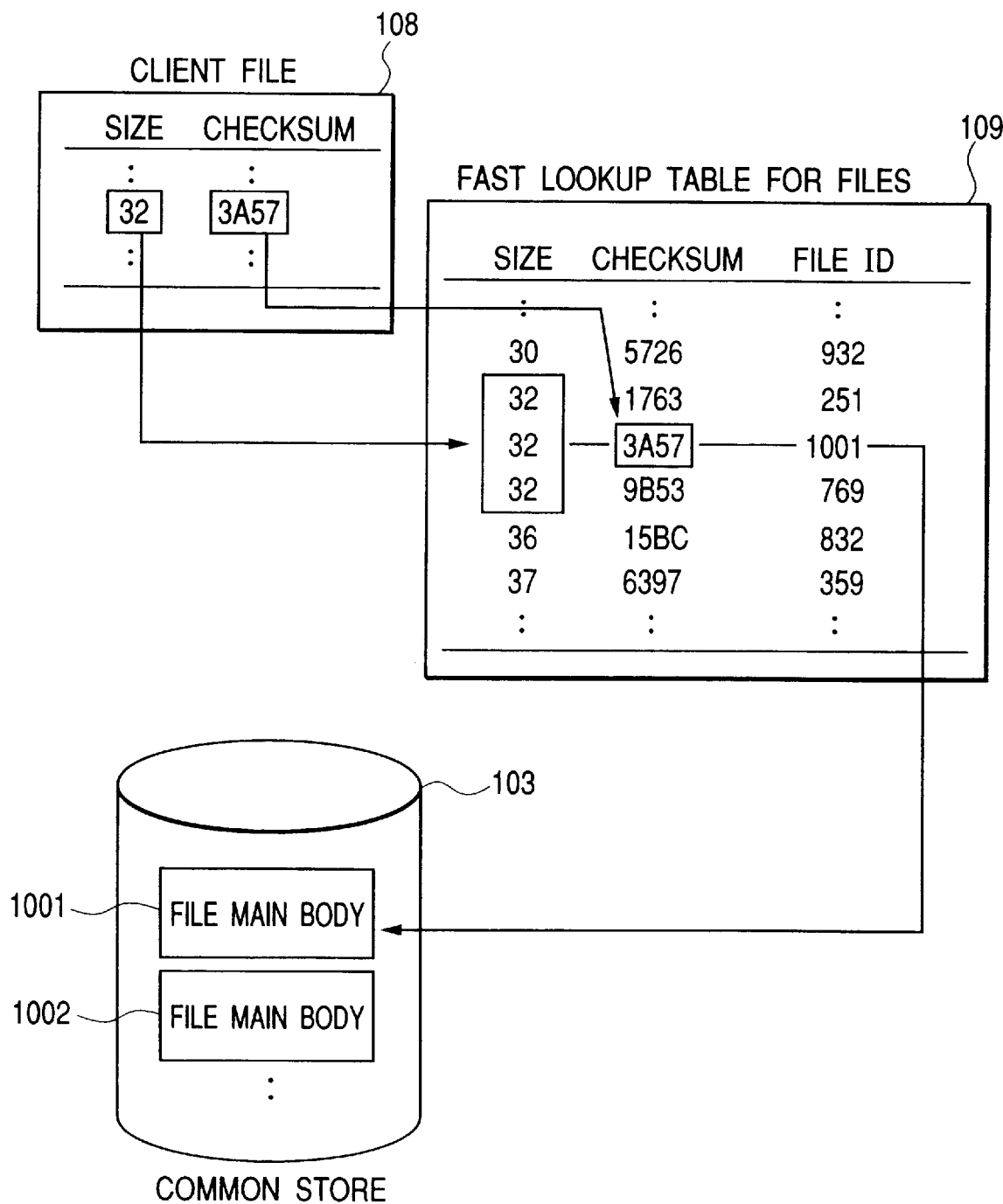
FIG. 18 shows an example of a file search method in the second embodiment.

FIG. 18 shows an example of a search method using the fast lookup table for files 109. The procedures of search if an identical file exists in the common store 103 for one of the files 108 sent from a client are shown in the figure. In step 1, the file information having the file size equal to that of a file in the files 108 sent from the client (in FIG. 18, 32 bytes) will be found in the fast lookup table for files 109. As mentioned above, since the fast lookup table for files 109 is sorted using the file size as a key, it is possible to search it with the binary search method. In the example shown in FIG. 18, there are three files having a file size of 32 bytes. In step 2, the file information having the same value of checksum as that of the file in the files 108 sent from the client will be found out of the files found in step 1. As described above, since the fast lookup table for files 109 is also sorted using checksum as a key, also in this search process the binary search method can be used. In the example shown in FIG. 18, only one file is found which has a coinciding checksum with that of the file in files 108. In step 3, the contents of the file main bodies are compared. The main body of a file found in step 2 (in the example shown in FIG. 18, a file having the file ID 1001) and the main body of the file in the files 108 sent from the client are compared with each other.

Following these procedures, the comparison between the file main bodies can be limited to those of files in which the file sizes and the checksum have coincided, so that the process quantity can be reduced. In the example shown in FIG. 18, the file size and the checksum are used in combination; however if the process load necessary to the calculation of the checksum is considered to be heavy, only the file size may be used.

3. Third Embodiment

The third embodiment relates to the protocol (communication procedures) between the server 10 and the client A 30. It can be realized in a form of being added to the first embodiment or to the second embodiment. In the following, the present embodiment will be explained based on the configuration of the second embodiment.

The purpose of the third embodiment is to reduce the file quantity to be transferred from the client A 30 to the server 10, when a backup process is executed. In order to realize the purpose, the third embodiment is arranged not to transfer the files which are considered to exist on the server 10. Whether a file identical to a file on the client A 30 side exists on the side of the server 10 or not is judged with reference to the file information such as the pathname, the file size, and the time stamp, or the checksum, CRC (cyclic redundancy code), etc. contained in the contents of files. As for the restore process, the arrangement shown in the second embodiment can be used.

Figure 19:
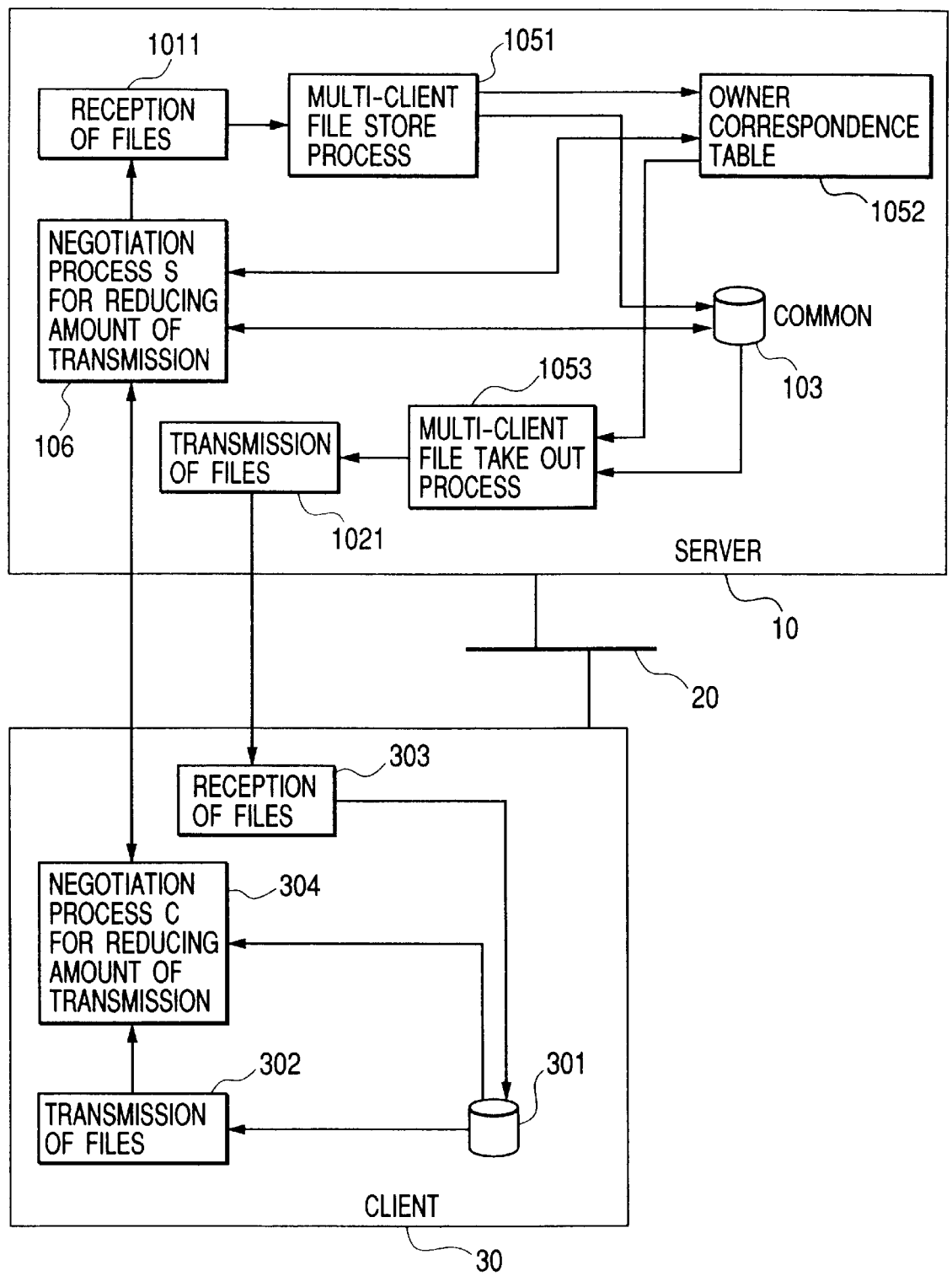
FIG. 19 shows a block diagram of a third embodiment.

FIG. 19 shows an example of a system configuration in which the third embodiment is actually utilized. The configuration shown in FIG. 19 is composed of a negotiation process for reducing amount of transmission S 106 (It is realized as a program executed by the CPU 41 on the memory 42) and a negotiation process for reducing amount of transmission C 304 (It is realized as a program executed by the CPU 41 on the memory 42) added to the configuration shown in FIG. 12 explained in the second embodiment. In the third embodiment, the explanation will be given based on the configuration shown in FIG. 19.

Figure 20:
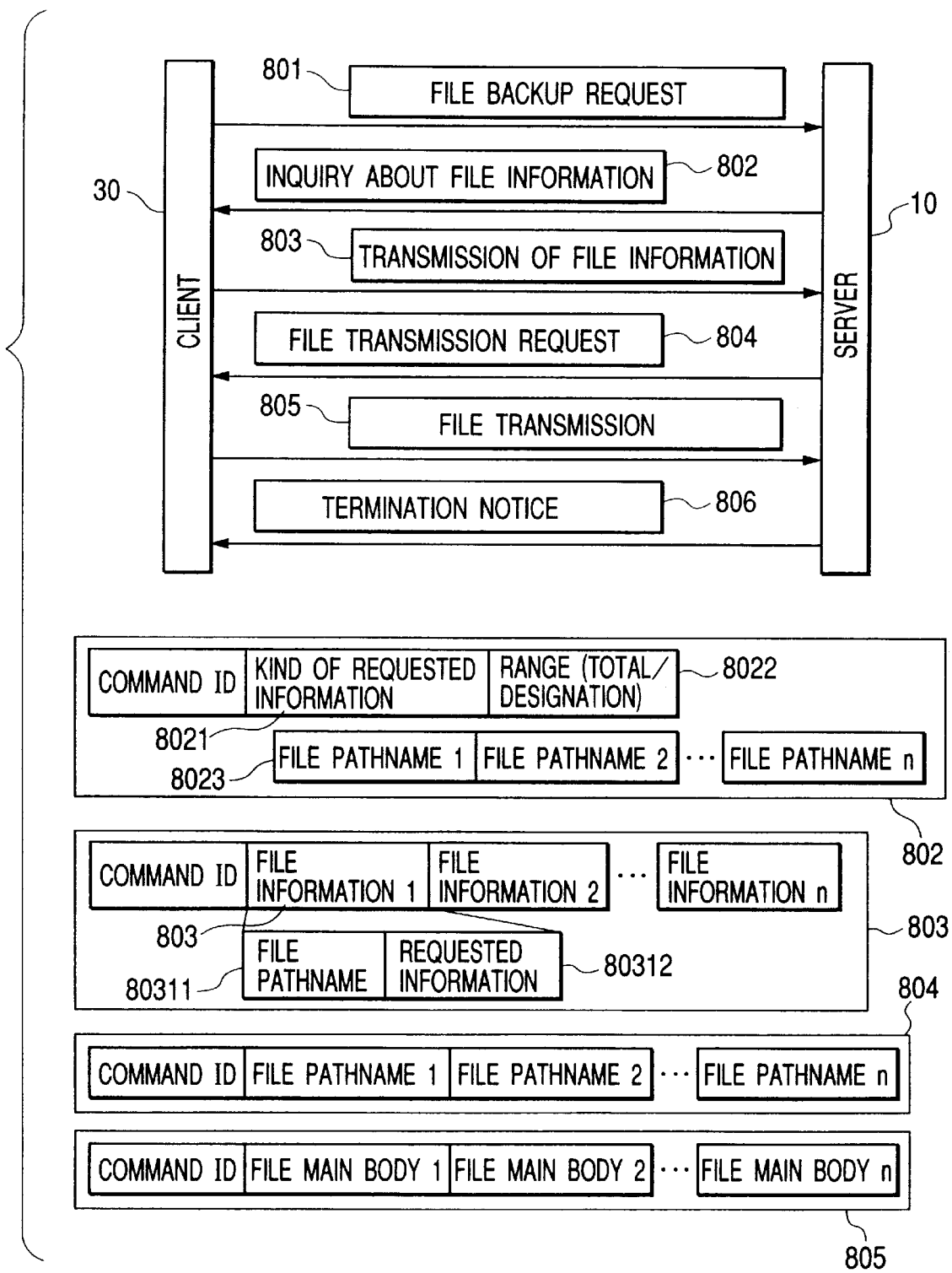
FIG. 20 shows a diagram showing the protocol of the third embodiment.

FIG. 20 shows the protocol between the server 10 and the client A 30 in the case of a backup process in the third embodiment. The format of information exchanged between the client A 30 and the server 10 is composed of a command ID (an identification code showing the contents of a notice) and optional information (It differs according to the contents of the notice). The procedures will be shown in the following.

At first, a file backup request 801 is issued from the client A 30 to the server 10. The server 10 which received the request issues a file information inquiry 802 to the client A 30. In the file information inquiry 802, the kind of required information 8021 is contained to inform the client side of check items (a file pathname, a file size, a time stamp, checksum, CRC, etc.) for checking the identity of files. For example, if the pathname, the size and the time stamp of files are to be made the reference for identity check of files, they should be designated in the file information inquiry 802 as check items. It is also possible to designate the range of files to be checked in the file information inquiry 802: two kinds of settings, the total or only a designated range, 8022 are possible. When the range is limited to the designated range, the file pathname follows the designation. The client A 30 which received the file information inquiry 802 investigates contents of files in the file apparatus 301 of its own about the designated items in the file information inquiry 802 and informs the server 10 of the result of investigation as file information transmission 803. The file information 8031 is included in the file information transmission 803. The file pathnames 80311 and the requested information 80312 are included in the file information 8031. The requested information 80312 has in the information of the requesting-information-kinds 8021 (a size, a time stamp, checksum, CRC, etc.) concerning the file pathname 80311. The server 10 which received the file information transmission 803 retrieves the file information contained in the file information transmission 803, and searches whether or not the files exist having the contents identical to those of files in the common store 103 or the owner correspondence table 1052 shown in the second embodiment. Of the file information contained in the file information transmission 803, when the files which are not found in the common store 103 and the owner correspondence table 1052 (in the case of the second embodiment) exist, the client A 30 is informed of the pathnames of the above-mentioned files as a file transmission request 804. The client A 30 which received the file transmission request 804 transmits the requested file main body to the server 10 as a file transmission 805. The server 10 which received the file transmission 805 stores the contents in the common store 103 and updates the contents of the owner correspondence table 1052. In the final step, the server 10 notifies the client A 30 that the backup process is terminated by transmitting a termination notice 806 to the client A 30.

In a case where the requiring-information-kind is fixed, or decided on the client side, the file backup request 801 and the file information inquiry 802 may be skipped and the process may be started from the file information transmission 803. In the case of FIG. 20, since it is known that the file transmission 805 is the final step of the backup process, the termination notice 806 can be omitted.

Figure 21:
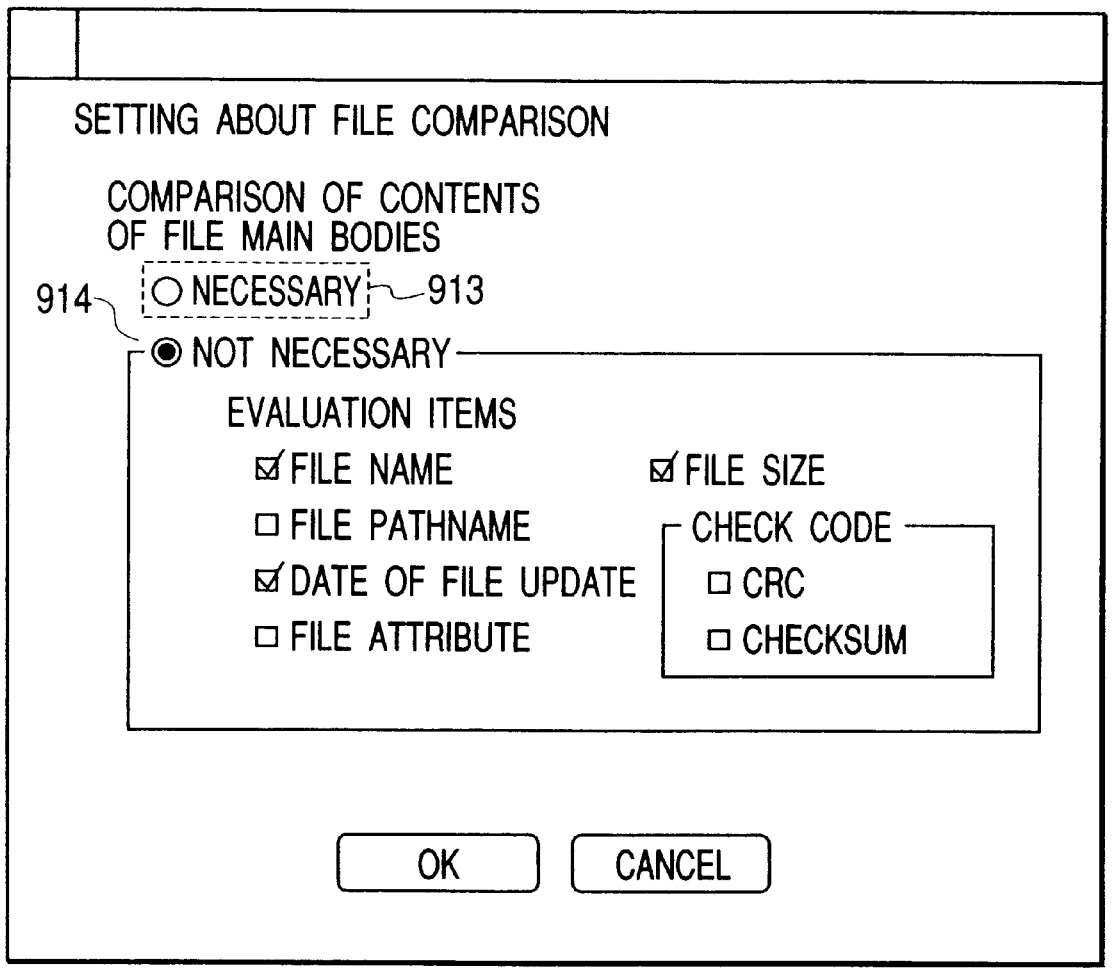
FIG. 21 shows an illustrative view showing a screen for the setting about file comparison in the third embodiment.

The check items for checking the identity of files may be changeable depending on users. FIG. 21 shows an example of the setting screen. As an important selection item, there is a selection to decide the comparison of the contents of file main bodies is necessary 913 or not necessary 914. When the identity of files is checked, if a user thinks that the contents of files should be checked, he will select "necessary 913". In the case where the check of the contents of files is not necessary, the user will select "not necessary 914". In the case where a user designates "necessary 913", the operation will be identical to that in the second embodiment. In the case where a user selects "not necessary", further, the user will select the check items when the identity of files is checked. The contents set in this screen image are stored in the server 10, and the selected check items will be designated with the requiring-information-kind 8021 in the file information inquiry 802 in the protocol.

Figure 22:
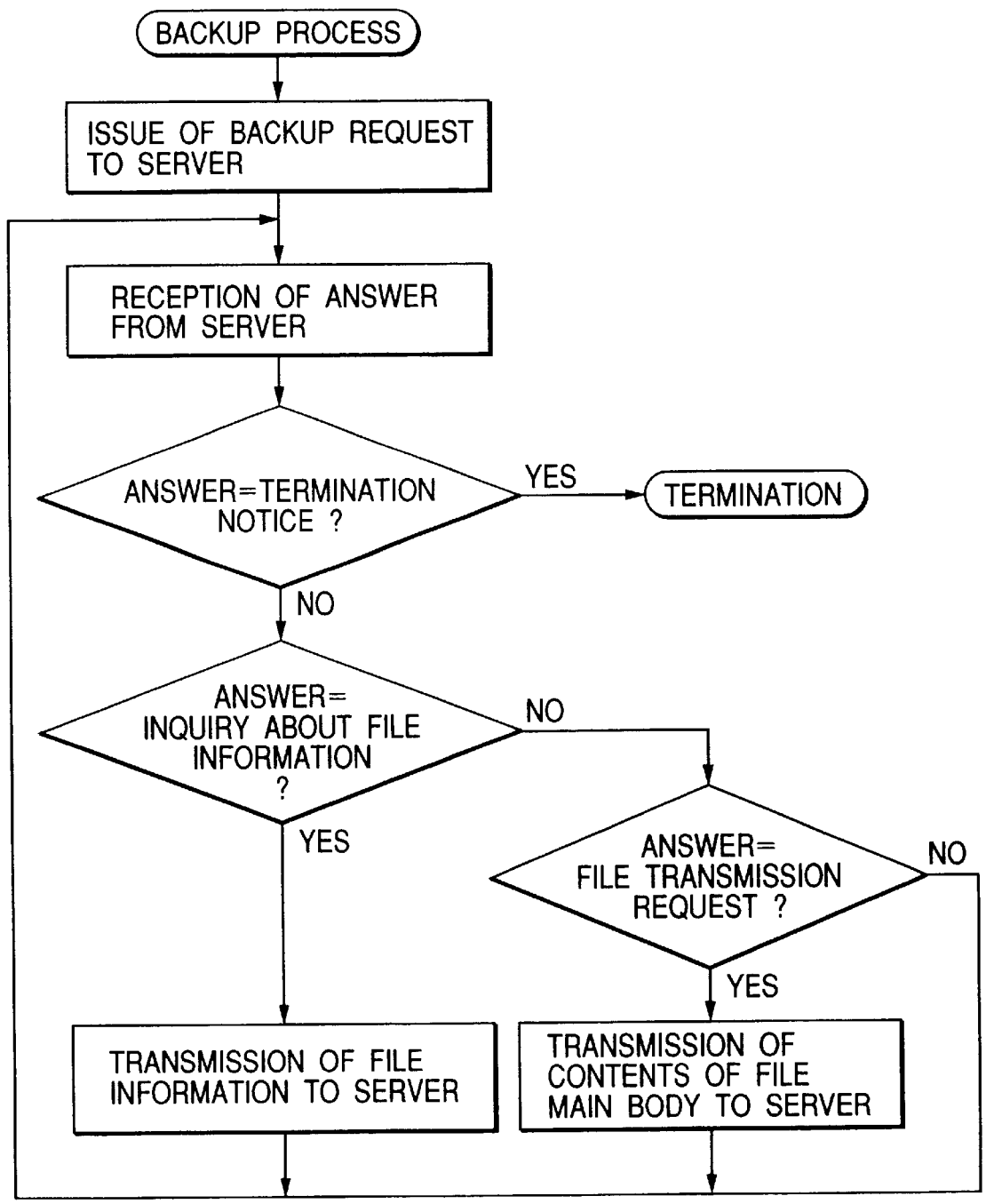
FIG. 22 shows a diagram showing procedures in a backup process on a client side in the third embodiment.

FIG. 22 shows a process flowchart on the client side which realizes the protocol shown in FIG. 20. At first, the client issues a backup request 801 to the server 10, and waits the response from the server 10. When the client receives a response from the server 10, it investigates the contents. If the response is a termination notice, the process is terminated. If the response is a file information inquiry 802, the client investigates the file apparatus 301 of its own and notifies the server 10 of the result of investigation as a file information transmission 803, and again the client enters the wait state for the response from the server 10. If the response from the server 10 is a file transmission request 804, the client takes out the file main body designated in the file transmission request 804 from the file apparatus 301, and transmits the contents of the main body as a file transmission 805 to the server 10, and again enters the wait state for the response from the server 10.

Figure 23:
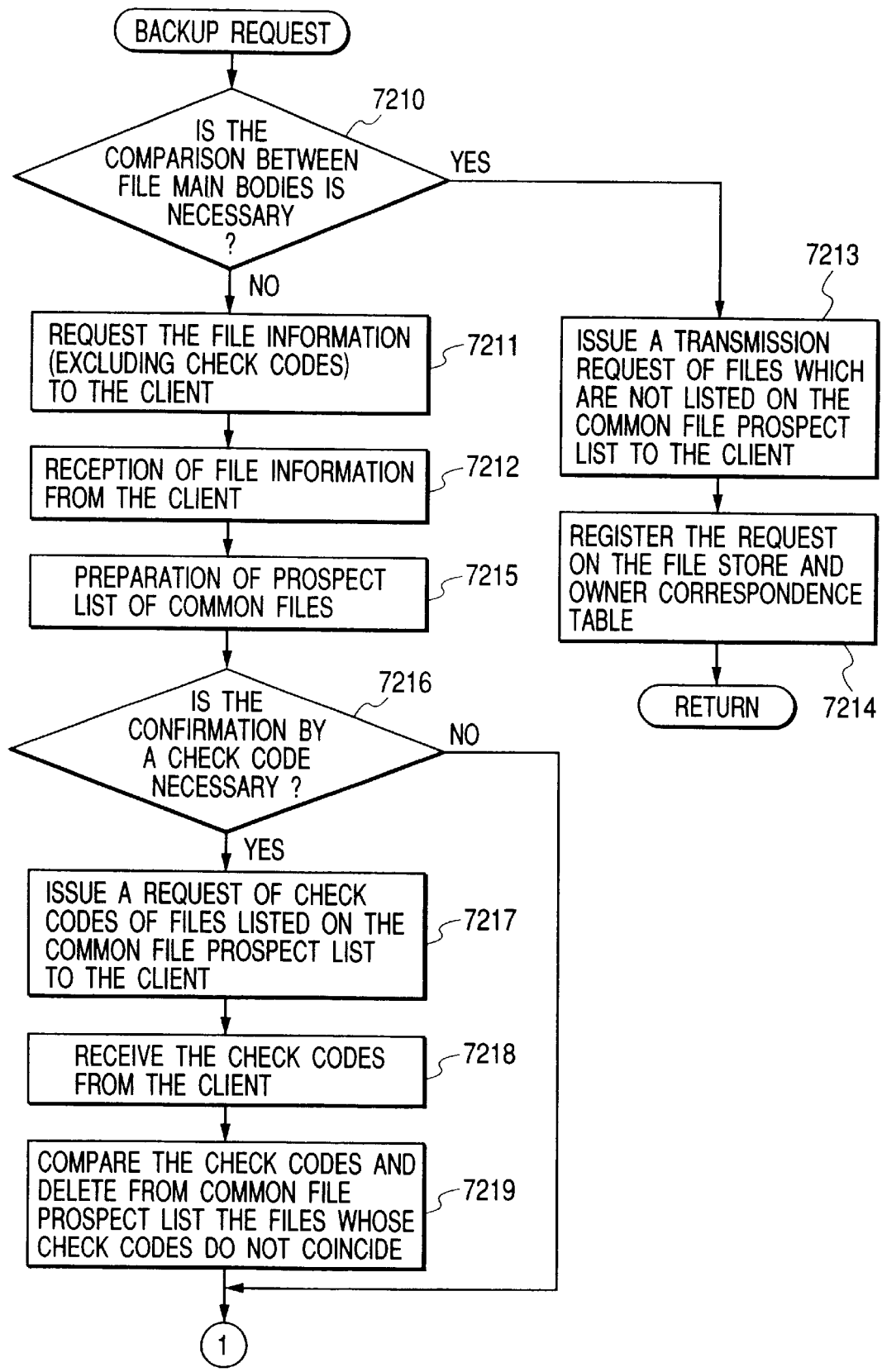
FIG. 23 shows a diagram showing procedures of a backup process in the former half on a server side in the third embodiment.
Figure 24:
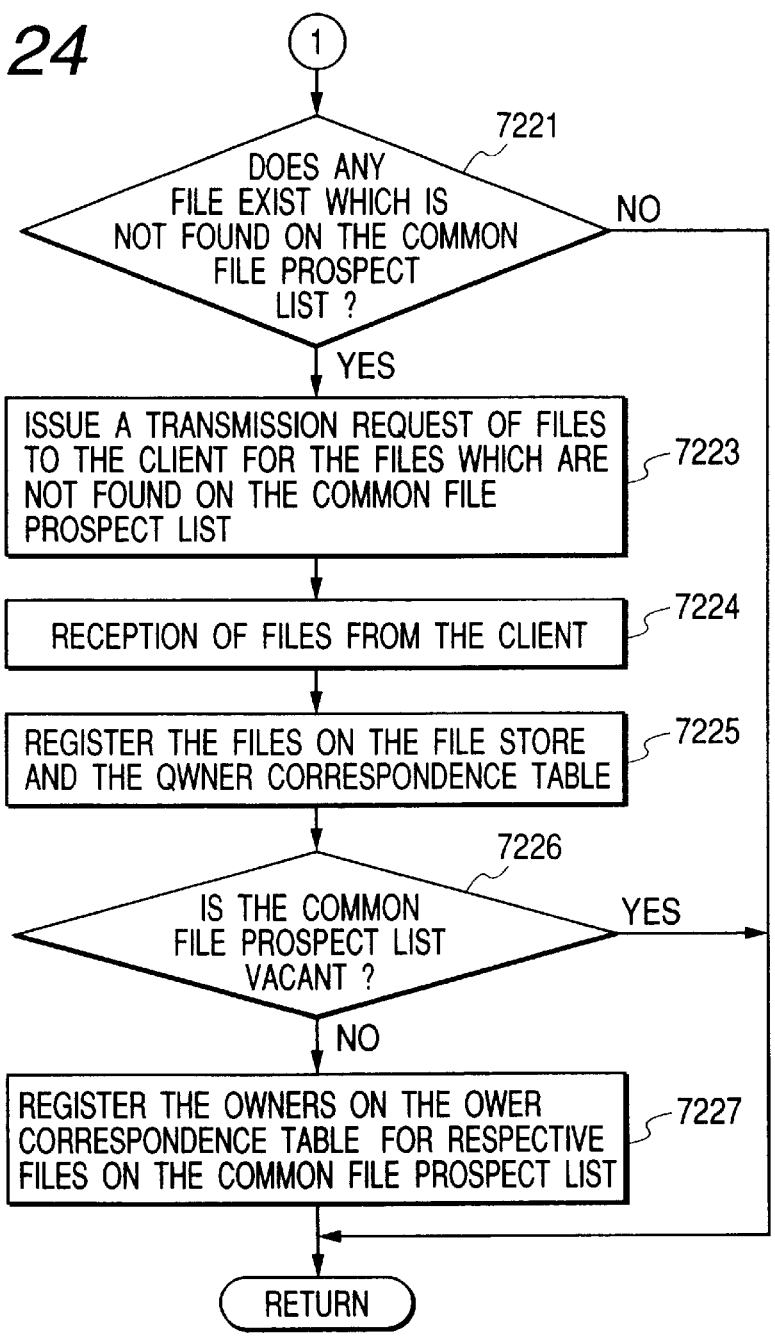
FIG. 24 shows a diagram showing procedures in a backup process in the latter half on the server side in the third embodiment.

FIGS. 23 and 24 show process flowcharts on the side of the server 10 which realizes the protocol in the third embodiment shown in FIG. 20.

When the server 10 receives a backup request 801 from the client A 30, at first the server 10 judges if the comparison of file main bodies is necessary (7210). The judgment is performed according to the contents set in the identity check setting in the third embodiment. In the case of the "necessary 913", the server 10 issues a transmission request of total files to the client (7213). Thereafter in the similar manner to the second embodiment, the server 10 receives files from the client A 30, confirms for the respective received files whether the files having the identical contents to those of the received files exist in the common store or not, the contents of the owner correspondence table 1052 and the common store 103 are updated (7214), and the process returns to the original position (termination of the process).

In the case of "not necessary 914, the server 10 issues a file-information-inquiry 802 for the total files to the client A 30 which issued the backup request 801 (7211). The contents of the file-information-inquiry 802 are obtained by removing the check codes from the contents set as shown in FIG. 21 for the purpose of increasing the process speed on the client side. In a case where no problem occurs in the function even when the check code process such as the checksum and CRC is performed, the processes, 7216, 7217, 7218, 7219, can be performed during the process 7211 is being performed.

Figure 25:
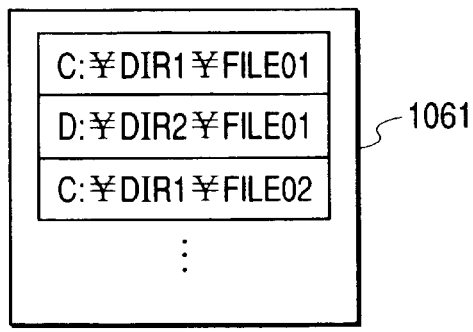
FIG. 25 shows an illustrative view showing an example of a prospect list of common data.

The server 10 receives the file information transmission 803 sent from the client A 30 (7212). Then the server 10 prepares a common-file-prospect-list 1061 (7215). The common-file-prospect-list 1061 is a table of file pathnames as shown in FIG. 25. A temporary memory area (area for variables) can be used for storing the above list. The server 10 compares the contents of files received in the process 7212 with those of files in the common store 103 and the owner correspondence table 1052, and the pathnames of common files are stored in the common-file-prospect-list 1061.

Following the above, it is judged whether the confirmation by check codes is necessary or not (7216). If the result of judgment is "not necessary", the step of process proceeds to a process shown in FIG. 24 (7221). When the result of judgment is "necessary", processes 7217, 7218, 7219, shown in FIG. 23 are executed. Namely, the server side requests the check codes of respective files in the common-file-prospect-list 1061 to the client side (7217). In other words, in the process 7216, the server requests the check codes of files which are considered to be identical in the result of comparison performed in the processes 7211 and 7212 shown in FIG. 23. When the server 10 receives the check codes of files from the clients (7218), it compares with those of files in the common store, and the files whose check codes are not identical to those of files in the common store are deleted from the common-file-prospect-list 1061 (7219), and the process proceeds to the process (7221) shown in FIG. 24.

In the procedures shown in FIG. 24, at first, it is judged if any file exists which is not listed in the common-file-prospect-list 1061 (7221). If such a file is not found, the process returns to the original position (Process is terminated). When such a file or files exist which are not found in the common-file-prospect-list, the server 10 issues a transmission request of such files to the client (7223). Thereafter, similar to the processes in the second embodiment, the server receives the files from the client A 30 (7224), confirms if a file having identical contents exists in the common store 103 for every file received, updates the contents of the owner correspondence table 1052 and the common store 103 (7225), and the process returns to the original step (Process is terminated). After that, the server judges if the common-file-prospect-list is vacant (7226), and if it is, the process returns to the original step (Process is terminated) If it is not, for every file on the common-file-prospect-list 1061 the contents of the owner correspondence table is updated (The client names which are the subjects of process are added to the table) (7227) and the process returns to the original step (Process is terminated).

As mentioned above, according to the third embodiment, when a backup file is transmitted from a client to the server, by the exchange of file attribute information (file pathnames, file sizes, time stamps, etc.) or check codes of file contents (CRC, checksum, etc.) performed between the server and the client beforehand, retransmission of files existing on the server already can be dispensed with. The process load of the server, the process load of the client and the load of the network at the time of the backup process are reduced, and also the processing time needed for the backup process can be shortened.

4. Summaries of a Fourth and a Fifth Embodiments

The fourth and the fifth embodiments relate to a method of file transfer from the server 10 to the client A 30, the transfer which occurs in the case of a restore process. These embodiments can be applied in a form of addition to or of replacement of the restore process in the first, the second or the third embodiment. In the following, the contents common to the fourth and the fifth embodiments will be explained.

When the backup file of the client A 30 is to be stored in the server 10, the file transfer quantity from a client A 30 to the server in each time can be reduced by using the technique shown in the third embodiment or of differential backup, etc. in comparison with the case where the same backup process is simply repeated. On the other hand, in the case of a restore process, all files for restore of the subject clients are to be transferred, so that file transfer quantity becomes large. Generally backup is performed periodically, but the frequency of execution of restore process is low.

In other words, in the case of backup, the transfer of files of comparatively small quantities is often performed; in contrast to this, in the case of restore, the transfer of files of large quantities occurs at a low frequency. In the fourth and fifth embodiments, the different character in file transfer is utilized, and different transfer means might be utilized for the backup operation and for the restore operation.

5. Fourth Embodiment
Restore Operation Utilizing a Storage Medium

In the following the fourth embodiment will be explained based on the second embodiment; however, the fourth embodiment can be also applied to the first embodiment and the third embodiment.

In the fourth embodiment, in the reception and the transmission of files from the server 10 to the client A 30 in a restore process, a storage medium is used. Therefore, a read apparatus and a write apparatus for a storage medium are provided on both sides, the server 10 and the client A 30.

Figure 26:
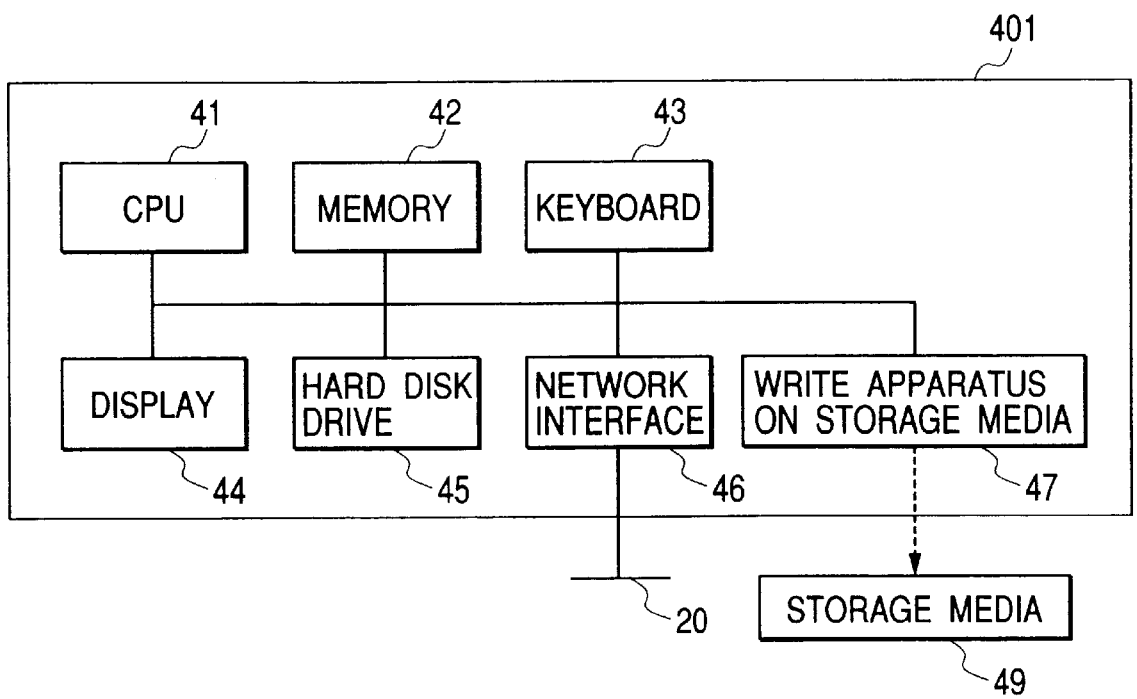
FIG. 26 shows a block diagram of hardware of a server in a fourth embodiment.

FIG. 26 shows the hardware configuration of the server 10 which is composed of a write apparatus for a storage medium 47 added to the hardware configuration in the first embodiment shown in FIG. 2. The write apparatus for a storage medium 47 has a function to write information onto a storage medium 49, and the apparatus may have both functions, write and read. For the storage medium 49, a portable type storage medium such as an MO, a CD-ROM (reloadable type), a DVD (reloadable type) is preferred; however, the storage medium is not necessarily be a portable type, and a storage means which is able to receive and transmit data (files) from the server 10 to the client A 30 will be applicable for the purpose.

Figure 27:
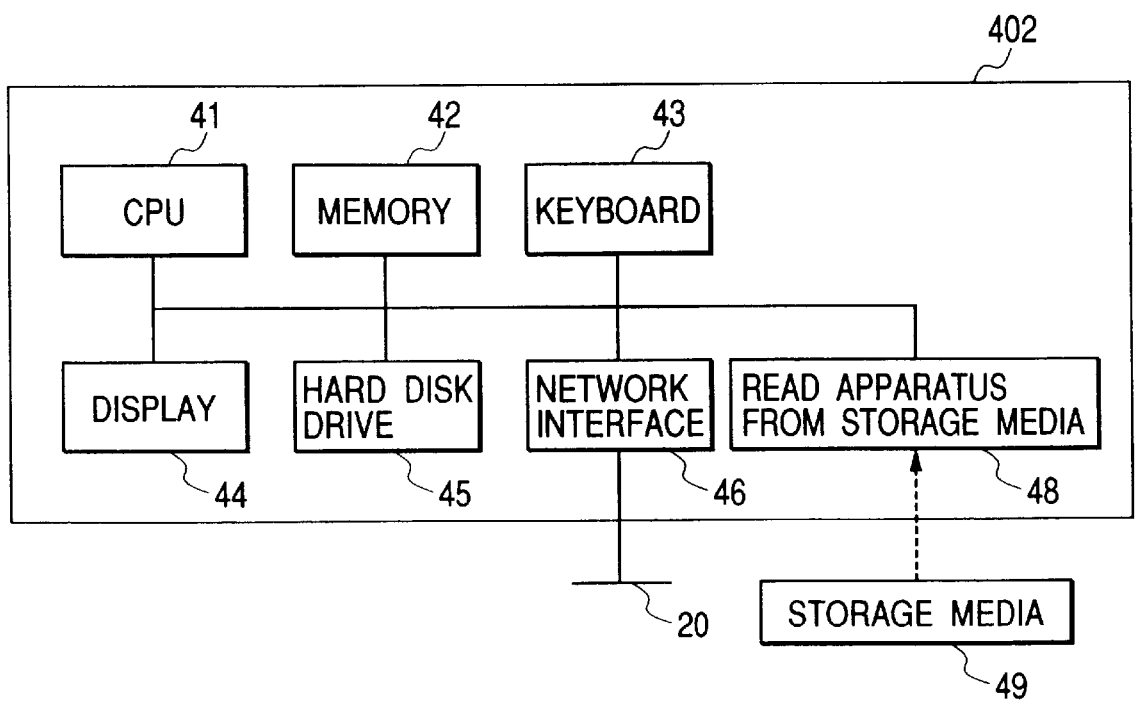
FIG. 27 shows a block diagram of hardware of a client in the fourth embodiment.

FIG. 27 shows the hardware configuration of the client A 30, and similar to the case of the sever 10, it is composed of a read apparatus for a storage medium 48 added to the hardware configuration in the first embodiment shown in FIG. 2. The read apparatus for a storage medium 48 comprises a function to read out the information stored in the storage medium 49. The read apparatus 48 may have a function to write.

Figure 28:
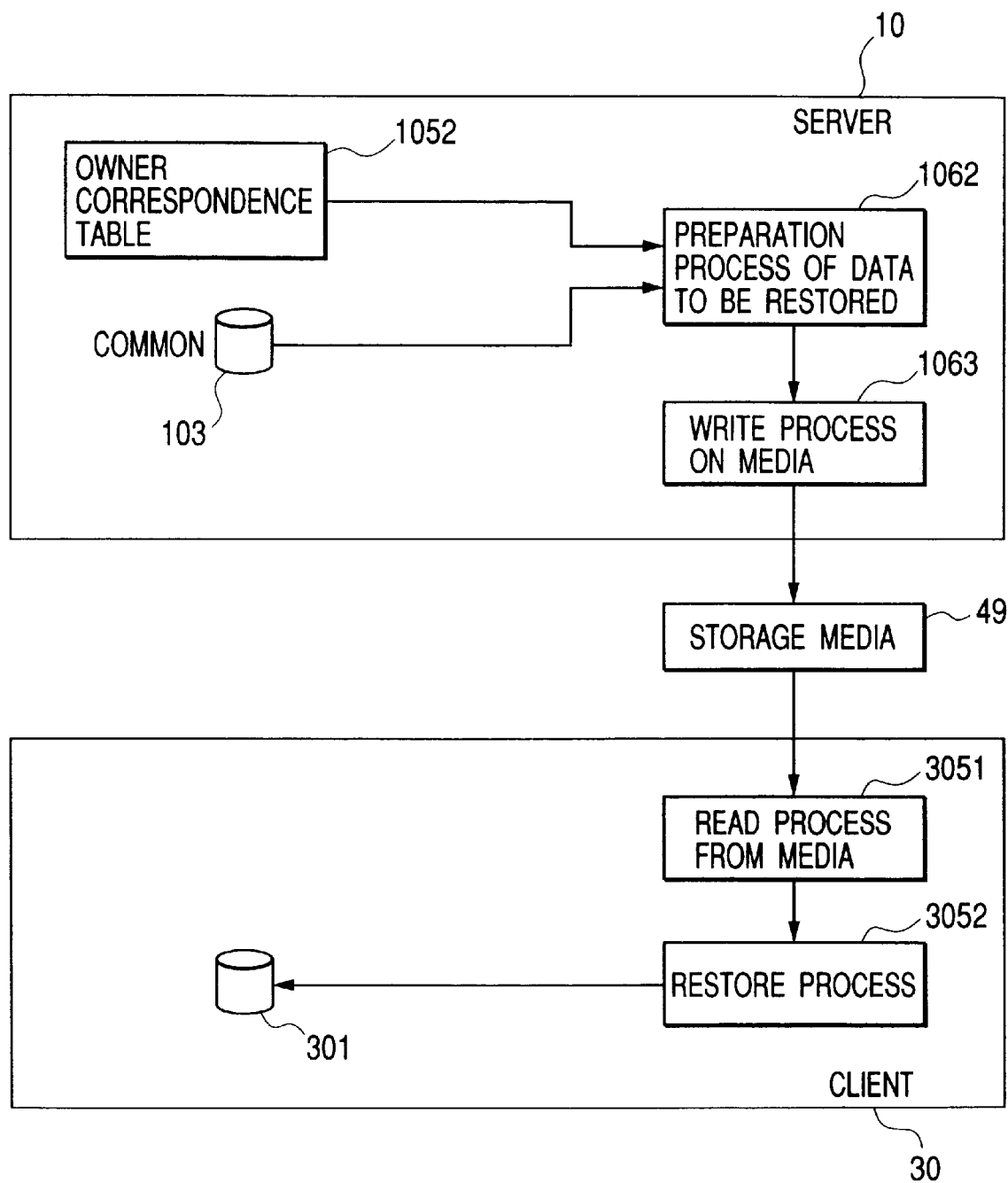
FIG. 28 shows a logical block diagram of the hardware in the fourth embodiment.

FIG. 28 shows a diagram showing a system configuration for the restore process with a storage medium and a flow of data. The server 10 comprises an owner correspondence table 1052, a common store 103, a medium preparation process 1062 for clients and a medium write process 1063. The owner correspondence table 1052 and the common store 103 are identical respectively to those shown in FIG. 12. The restore-data-preparation-process 1062 (It is realized as a program executed by the CPU 41 on the memory 42) has a function to prepare the data to be given to a client based on the owner correspondence table 1052 and the common store 103. The medium-write-process 1063 (It is realized as a program executed by the CPU 41 on the memory 42) has a function to write the data prepared by the restore-data-preparation-process 1062 onto the storage medium 49. On the other hand, there are ae medium-read-process 3051, a restore process 3052 (Both of them in the above are respectively realized in a program executed by the CPU 41 on the memory 42) and a file apparatus 301 in the client A 30. The medium read process 3051 has a function to read out the information stored in the storage medium 49.

Figure 29:
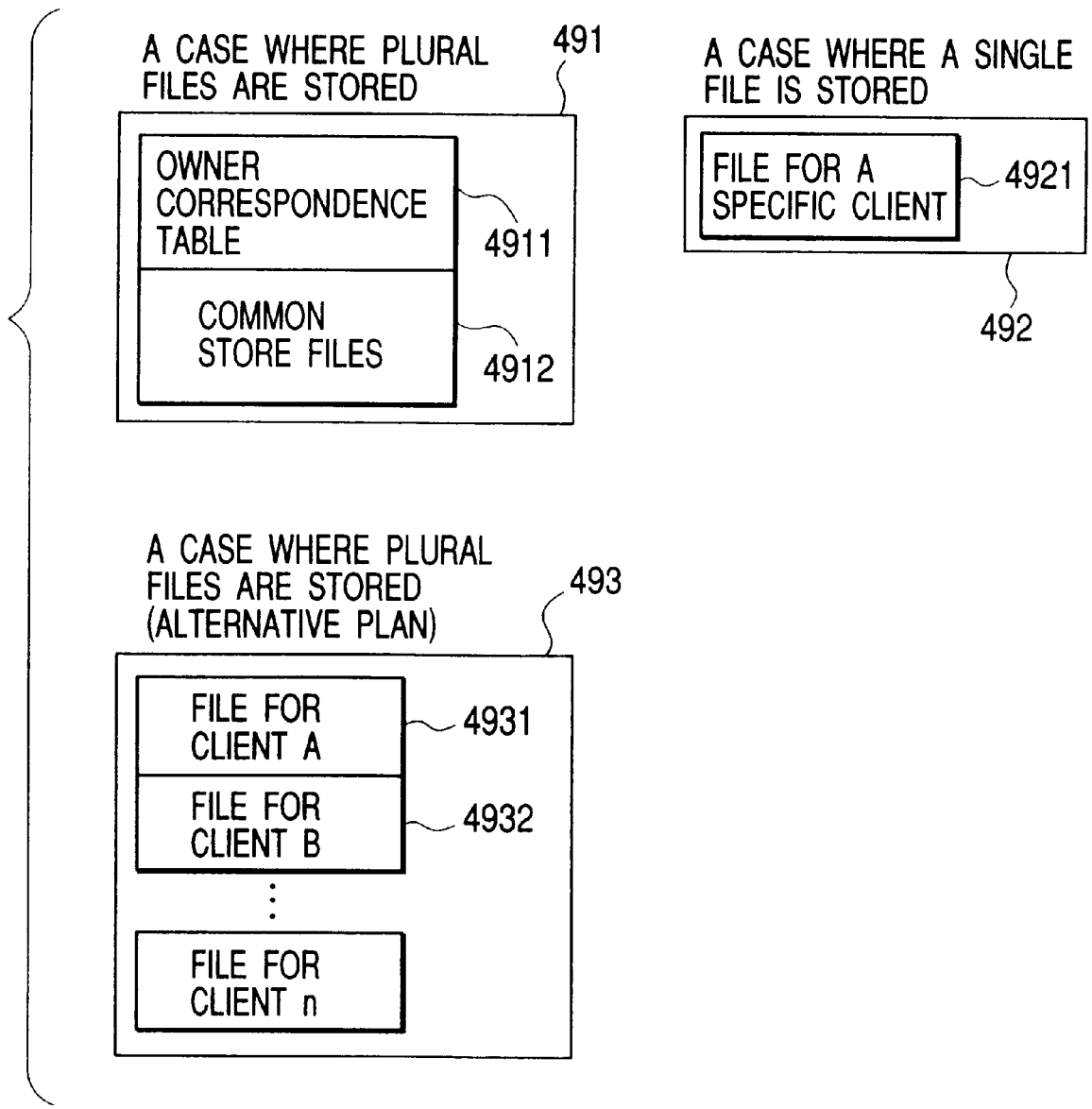
FIG. 29 shows an illustrative view showing contents of a storage medium in the fourth embodiment.

FIG. 29 shows the storage contents of the storage medium 49. The structure of the storage medium 49 having the client information of a plurality of clients is different from that of the storage medium 49 having the client information of a single client. In the case of 491 where the storage medium stores the client information of a plurality of clients, the storage medium 49 contains the owner correspondence table 4911 and the common store file 4912. In other words, the common file method among clients also works on the storage medium 49. Alternatively, a plurality of client files may be stored individually (493), and in the case of a single file, a file of a client being the subject of restore can be stored in the medium (492).

Figure 30:
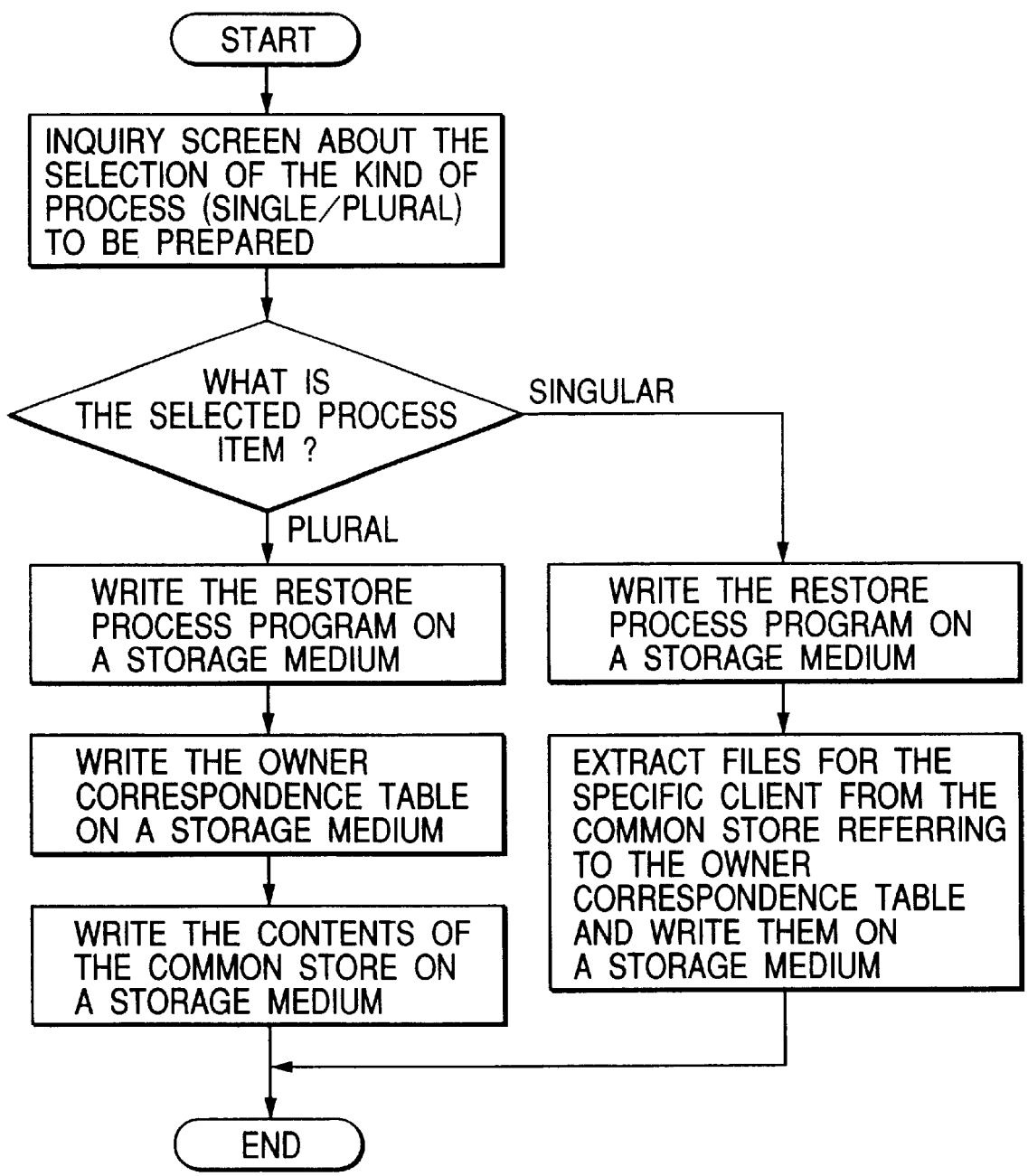
FIG. 30 shows a diagram showing the preparation process of a storage medium on the server side in the fourth embodiment.
Figure 31:
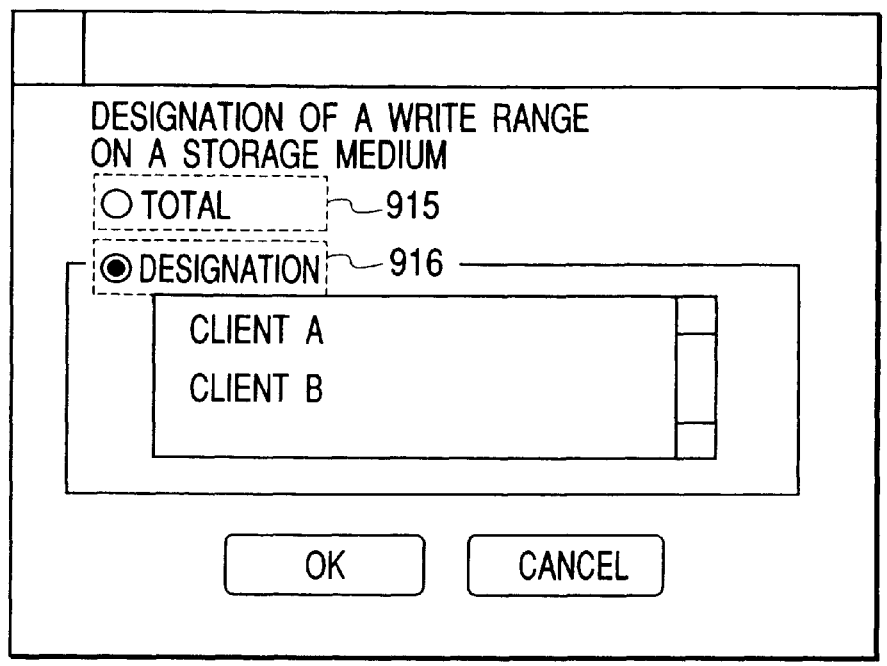
FIG. 31 shows an illustrative view showing a screen for designation of the kind of the storage medium in the fourth embodiment.

FIG. 30 shows the storage-medium-preparation-process 1062 on the server side. At first, the decision as to whether the restore data of all clients are to be stored in the storage medium 49 or those of partial clients are to be stored in it will be done by a user utilizing total range 915 or designated range 916 in a screen for the selection shown in FIG. 31. When the designated range 916 is selected, further the user will select the clients. If always total clients would be selected, this selection screen is not needed. Next, it will be judged whether the number of client machines is the singular number or the plural number. In the case of the plural number, the contents of the owner correspondence table 1052 are investigated, the records owned by the designated clients are extracted and written onto the storage medium 49, and further the file main bodies of the above-mentioned clients are extracted from the common store 103 and written onto the storage medium 49. In the case of the singular number, the contents of the owner correspondence table 1052 are investigated, and the file main body owned by the designated client is extracted from the common store 103 and written onto the storage medium 49.

Figure 33:
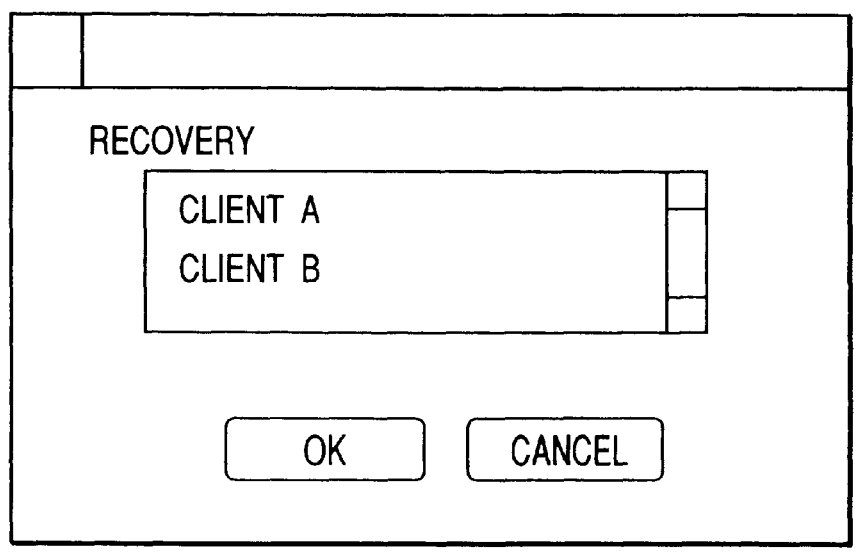
FIG. 33 shows an illustrative view showing a screen for the selection of client names in the fourth embodiment.
Figure 32:
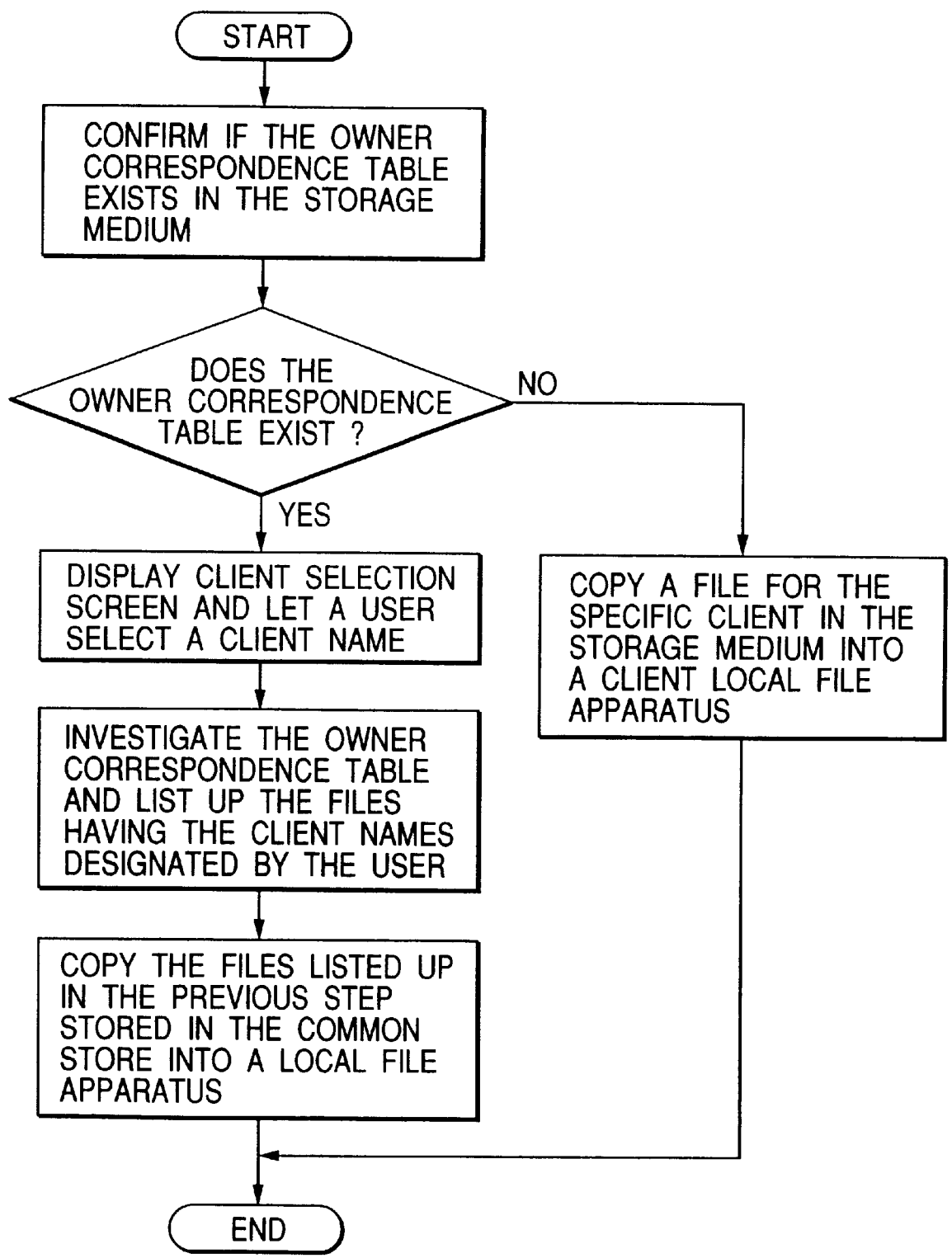
FIG. 32 shows a diagram showing procedures of a restore process in the fourth embodiment.

FIG. 32 shows a flowchart showing the procedures of the restore process 3052 on the client side. At first, the contents stored in the storage medium 49 are investigated, and it is judged if the owner correspondence table 4911 is included in the storage medium 49. If the table is not found, it is judged that the information of a single client is included, and the contents of the file for a specific client 4921 are restored in the file apparatus 301 of the client A 30, and the restore process is terminated. When the owner correspondence table 4911 is found, it will be confirmed by the user that which client among the clients listed on the owner correspondence table will be a subject client for restore operation, for example, utilizing a confirmation screen as shown in FIG. 33. If the client A 30 itself has a means to know client names due to a reason that the OS (Operating System) of the client A 30 holds the client names, etc., the client names obtained utilizing the above-mentioned means may be automatically selected. In that case, the selection operation of client names by a user is not needed. When the client names are made clear, the contents of the owner correspondence table 4911 in the storage medium 49 are investigated to find out a file or a file group of the clients concerned, the contents of the file main body or bodies of the corresponding files are taken out from the common store file 4912, and the process is terminated after restoring them in the file apparatus 301.

6. Fifth Embodiment
Restore Operation Performed with the Utilization of a Large Capacity Communication Network In the fifth embodiment, a communication network suitable for the transfer of the data of a large quantity like the communication network utilizing a communication satellite is utilized for the transfer of data between the sever 10 and the client A 30 in the case of a restore operation. This method is suitable for the data transmission of comparatively large capacity as in the case of the restore operation according to the present invention. A communication means being able to transfer data simultaneously to a large number of receivers for multicast and broadcast including communication via a communication satellite is suitable for the distribution of data in the system which has the structure in which data are commonly utilized by a plurality of clients like the present invention. When there is a margin in the band width of the communication network, the restore data, that is, the owner correspondence table 1052 and the common store 103 are constantly transmitted and a client may receive the transmitted data when a client feels the need for the restore operation of a file.

Figure 34:
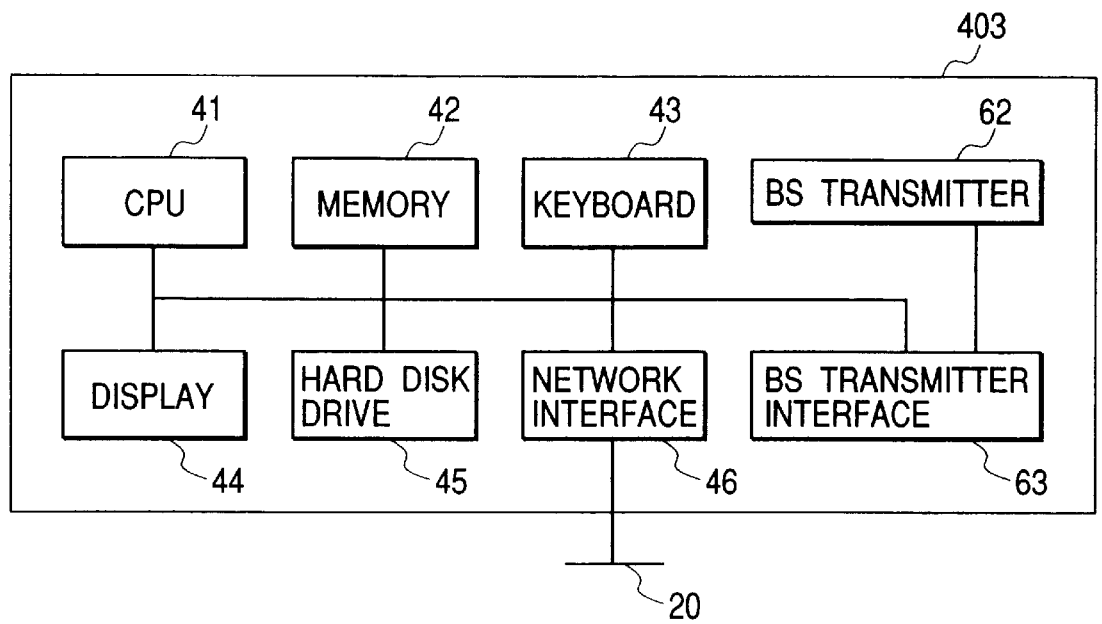
FIG. 34 shows a block diagram of hardware of a server in a fifth embodiment.
Figure 35:
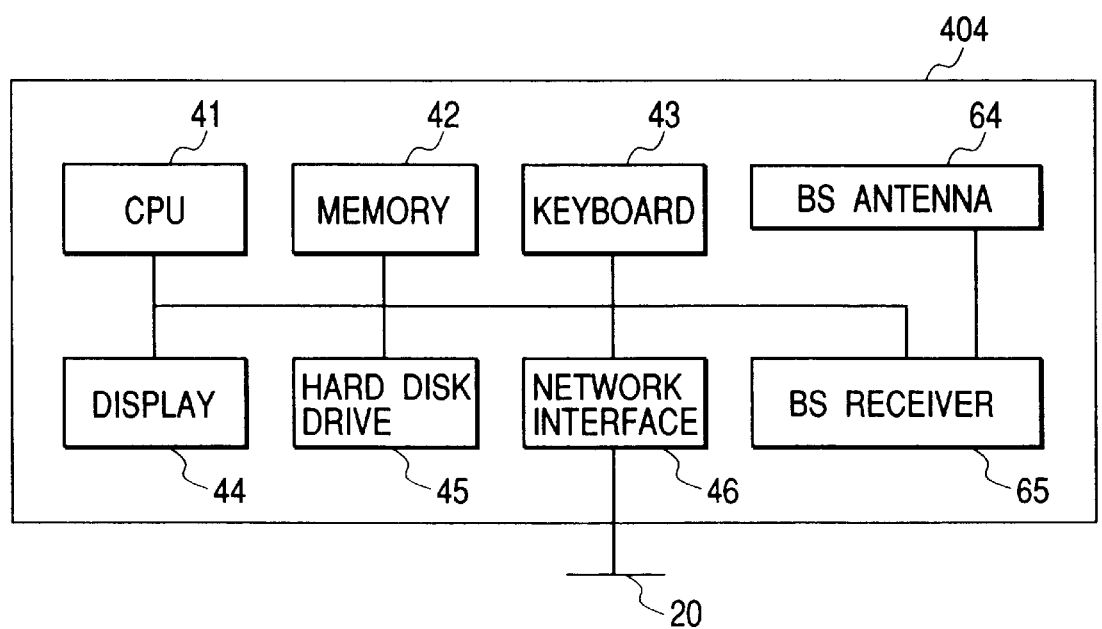
FIG. 35 shows a block diagram of hardware of a client in the fifth embodiment.

In the fifth embodiment, since a communication satellite is used as a data transfer means, the server 10 is provided with a transmitting apparatus for a communication satellite and the client A 30 is provided with a receiving apparatus for the communication satellite. An example of the hardware configuration on the server 10 side is shown in FIG. 34 and that on the client.A 30 side is shown in FIG. 35.

Figure 36:
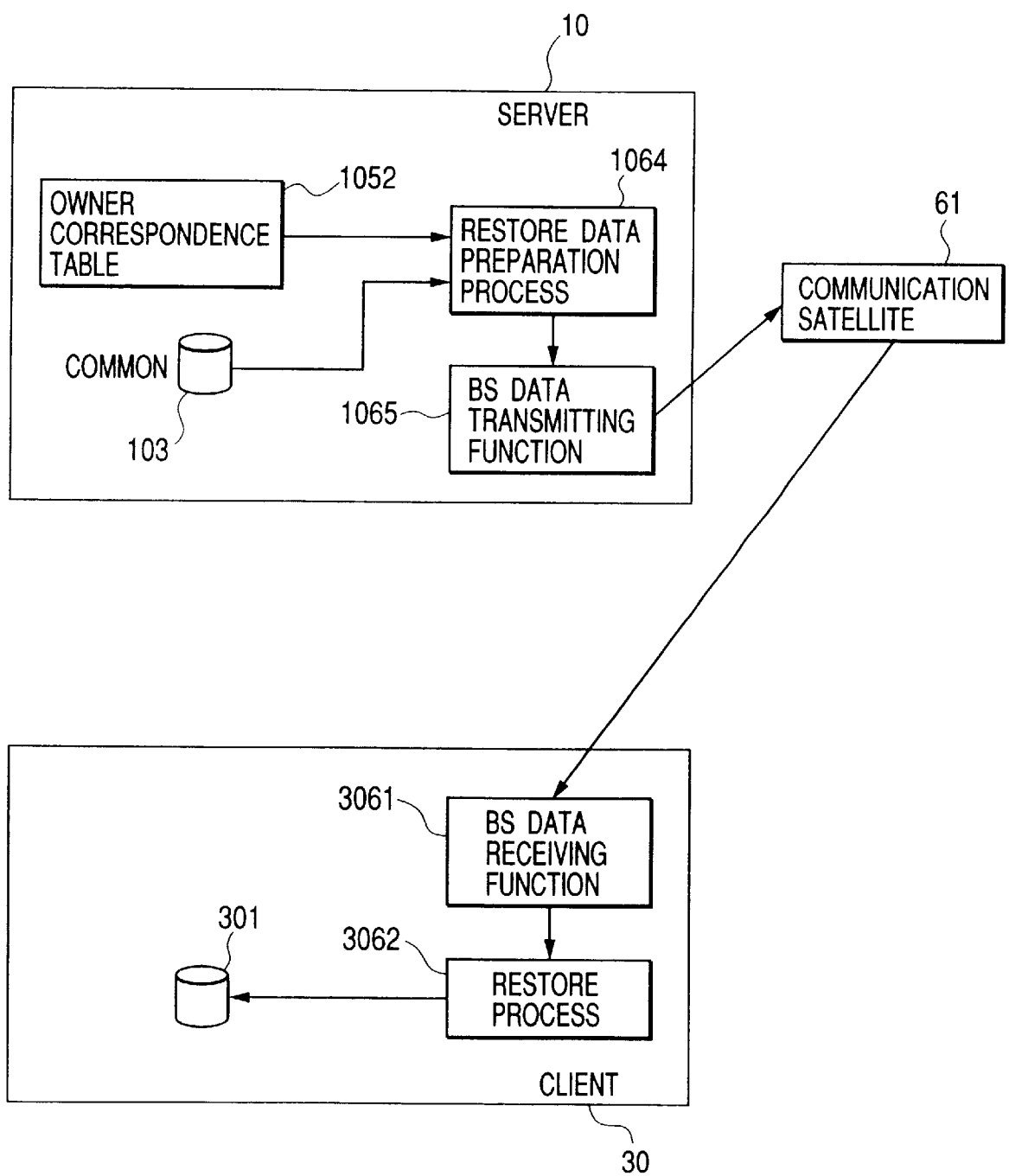
FIG. 36 shows an illustrative view showing the transfer of a restore file via a communication satellite in the fifth embodiment.

FIG. 36 shows an example of a system configuration of a restore portion using a communication satellite. The configuration is substantially identical to that of the fourth embodiment; however, in the fifth embodiment, a communication satellite 61 is utilized in place of the storage medium 49. In conformity with the above, the server 10 side is provided with a BS (Broadcast Satellite) transmitter 1065 and the client A30 side is provided with a BS receiver 3061. The contents of process is identical to those in the fourth embodiment.

As mentioned above, in the fourth and fifth embodiments, as a file transfer means from the server to the client in the case of the restore process, a storage medium such as an MO disk or a large capacity communication network such as a communication satellite is used. Owing to the arrangement as mentioned above, the network traffic between the server and the client used in general can be reduced.

According to the present invention, in an environment where a plurality of client machines are used, it is made possible to reduce the backup data size of a storage apparatus in a client machine.

Further, the backup is promoted by removing obstacles for the backup, and a system has been improved to be able to cope with the recovery from a disk crush, which makes it possible to lower the management cost of the system.

What is claimed is:

1. A data back-up system in an information processing system including a plurality of information processing apparatuses and their corresponding storage means, wherein at lease one of said plurality of information processing apparatuses, comprising:

means for storing location information, where said location information corresponds to data stored in each of said apparatuses subject to backup;

means for obtaining said data subject to backup stored in each corresponding apparatus;

means for detecting a data portion common among said apparatuses subject to back up and a data portion unique to each of said apparatuses subject to backup, based on said location information, and the data obtained from the respective apparatuses;

a first storage means for storing the detected common data portion and a second storage means for storing the detected unique data portion; and means for restoring a memory failure in a respective apparatus by retrieving said common data portions and said unique data portions corresponding to said respective apparatus.

2. A data backup system according to claim 1, wherein said location information is stored when said data, subject to backup, is obtained according to the obtaining means.

3. A data back up method executed by an information processing system including a plurality of information processing apparatuses and their corresponding storage means said method comprising the steps of:

storing a location information, wherein said location information corresponds to data stored in each of said apparatuses subject to backup;

obtaining said data subject to backup stored in each corresponding apparatus;

detecting a data portion common among said apparatuses subject to backup and a data portion unique to the respective apparatuses subject to backup, based on said location information, and the data obtained from the respective apparatuses;

storing at least one data portion of said detected common data portion and said detected unique data portion; and restoring a memory failure in a respective apparatus by retrieving said common data portions and said unique data portions corresponding to said respective apparatus.

4. A data backup method according to claim 3, wherein said location information is stored when said data, subject to backup, is obtained according to the obtaining step.

5. A data backup system in an information processing system including a plurality of client apparatuses and at least a server, said server comprising:

means for storing location information, wherein said location information corresponds to data stored in each of said apparatuses subject to backup;

means for obtaining said data held in the respective client apparatuses;

means for detecting a data portion common among said client apparatuses and a data portion unique to the client apparatuses, based on said location information, and the data obtained from the respective client apparatuses;

a first storage means for storing the detected common data portion and a second storage means for storing the detected unique data portion; and means for restoring a memory failure in a respective apparatus by retrieving said common data portions and said unique data portions corresponding to said respective apparatus.

6. A data backup system according to claim 5, further comprising means for storing data which shows that the data in the stored common data portion belongs to which client apparatus.

7. A data backup system according to claim 5, further comprising means for restoring data for every client apparatus based on the stored common data portion and the stored unique data portion.

8. A data backup system according to claim 5, wherein said client apparatus comprises means for transmitting attributive information of data to be a subject of backup to said server when either the means for storing said detected common data portion or the means for storing said detected unique data portion exists in said server.

9. A data backup system according to claim 8, wherein said server comprises means for deciding a range of data which is required to be transferred from said client apparatus to said server in the case of backup operation based on said data attributive information transmitted from the respective client apparatuses.

10. A data backup system according to claim 9, wherein said data attributive information includes data size information.

11. A data backup system according to claim 9, wherein said data attributive information includes information on a date of update of data.

12. A data backup system according to claim 5, wherein said obtained data forms at least a file to complete.

13. A data backup system according to claim 5, wherein said location information is stored when said data, subject to backup, is obtained according to the obtaining means.

14. A data backup method executed by an information processing system including a plurality of client apparatuses and at least a server, comprising:

- a step of storing a location information, wherein said location information corresponds to data stored in each of said apparatuses subject to backup;
- a step of obtaining said data;
- a step of detecting a data portion common among said client apparatuses and a data portion unique to each of said client apparatuses, based on said location information, and the obtained data;
- a step of storing at least one date portion of said detected common data portion and said detected unique data portion; and
- restoring a memory failure in a respective apparatus by retrieving said common data portions and said unique data portions corresponding to said respective apparatus.

15. A data backup method according to claim 14, wherein said location information is stored when said data, subject to backup is obtained according to the obtaining step.

* * * * *